(12) United States Patent
Wires et al.

(10) Patent No.: US 10,019,159 B2
(45) Date of Patent: Jul. 10, 2018

(54) SYSTEMS, METHODS AND DEVICES FOR MANAGEMENT OF VIRTUAL MEMORY SYSTEMS

(71) Applicant: OPEN INVENTION NETWORK LLC, Durham, NC (US)

(72) Inventors: Jacob Taylor Wires, Vancouver (CA); Andrew Warfield, Vancouver (CA); Daniel Stodden, Vancouver (CA); Dutch Meyer, Bellingham, WA (US); Jean Maurice Guy Guyader, Vancouver (CA); Keir Fraser, Cambridge (GB); Timothy John Deegan, Cambridge (GB); Brendan Anthony Cully, Vancouver (CA); Christopher Clark, Tigard, OR (US); Mohammad Abdul-Amir, Vancouver (CA)

(73) Assignee: Open Invention Network LLC, Durham, NC (US)

( * ) Notice: Subject to any disclaimer, the term of this patent is extended or adjusted under 35 U.S.C. 154(b) by 154 days.

(21) Appl. No.: 13/804,456

(22) Filed: Mar. 14, 2013

(65) Prior Publication Data
US 2013/0282994 A1 Oct. 24, 2013

Related U.S. Application Data

(60) Provisional application No. 61/610,691, filed on Mar. 14, 2012.

(51) Int. Cl.
*G06F 3/06* (2006.01)
*G06F 9/455* (2018.01)
*G06F 15/16* (2006.01)

(52) U.S. Cl.
CPC ........ *G06F 3/0604* (2013.01); *G06F 9/45558* (2013.01); *G06F 15/16* (2013.01); *G06F 2009/45583* (2013.01)

(58) Field of Classification Search
CPC .................................. G06F 9/455; G06F 15/16
See application file for complete search history.

(56) References Cited

U.S. PATENT DOCUMENTS 4,912,628 A 3/1990 Briggs
5,222,217 A 6/1993 Blount et al.
(Continued)

OTHER PUBLICATIONS

International Search Report and the Written Opinion of the International Searching Authority, Convergent.IO Technologies Inc., dated Jul. 11, 2013.
(Continued)

*Primary Examiner* — Charles Rones
*Assistant Examiner* — Tian-Pong Chang

(57) ABSTRACT

Systems, methods and devices for management of instances of virtual memory components for storing computer readable information for use by at least one first computing device, the system comprising at least one physical computing device, each physical computing device being communicatively coupled over a network and comprising: a physical memory component, a computing processor component, an operating system, a virtual machine monitor, and virtual memory storage appliances; at least one of the virtual memory storage appliances being configured to (a) accept memory instructions from the at least one first computing device, (b) instantiate instances of at least one virtual memory component, (c) allocate memory resources from at least one physical memory component for use by any one of the least one virtual memory components, optionally according to a pre-defined policy; and (d) implement memory instructions on the at least one physical memory component.

33 Claims, 4 Drawing Sheets

(56) References Cited

U.S. PATENT DOCUMENTS

| | | | |
|---|---|---|---|
| 5,257,386 A | 10/1993 | Saito | |
| 5,949,876 A | 9/1999 | Ginter et al. | |
| 6,151,618 A | 11/2000 | Wahbe et al. | |
| 6,298,390 B1 | 10/2001 | Matena et al. | |
| 6,298,428 B1 | 10/2001 | Munroe et al. | |
| 6,311,213 B2 | 10/2001 | Dawson et al. | |
| 6,324,627 B1 | 11/2001 | Kricheff et al. | |
| 6,397,242 B1 | 5/2002 | Devine et al. | |
| 6,438,642 B1 | 8/2002 | Shaath | |
| 6,493,811 B1 | 12/2002 | Blades et al. | |
| 6,496,847 B1 | 12/2002 | Bugnion et al. | |
| 6,757,778 B1 | 6/2004 | van Rietschote | |
| 6,978,356 B2 | 12/2005 | Selkirk et al. | |
| 6,990,573 B2 | 1/2006 | Cherian et al. | |
| 7,043,614 B2 | 5/2006 | Umbehocker et al. | |
| 7,047,359 B1 | 5/2006 | Van Krevelen et al. | |
| 7,062,624 B2 | 6/2006 | Kano | |
| 7,203,944 B1 | 4/2007 | van Rietschote et al. | |
| 7,206,805 B1* | 4/2007 | McLaughlin, Jr. | 709/203 |
| 7,222,172 B2 | 5/2007 | Arakawa et al. | |
| 7,246,200 B1 | 7/2007 | van Rietschote et al. | |
| 7,266,637 B1 | 9/2007 | van Rietschote | |
| 7,299,464 B2 | 11/2007 | Shultz et al. | |
| 7,430,639 B1 | 9/2008 | Bali et al. | |
| 7,441,096 B2 | 10/2008 | Kitamura | |
| 7,447,714 B1 | 11/2008 | Mackrory et al. | |
| 7,448,079 B2 | 11/2008 | Tremain | |
| 7,499,980 B2 | 3/2009 | Gusler et al. | |
| 7,509,331 B2 | 3/2009 | Nemoto et al. | |
| 7,546,307 B2 | 6/2009 | Terrell, II | |
| 7,562,189 B2 | 7/2009 | Hamilton et al. | |
| 7,577,959 B2 | 8/2009 | Nguyen et al. | |
| 7,603,670 B1 | 10/2009 | van Rietschote | |
| 7,640,292 B1 | 12/2009 | Smoot | |
| 7,689,767 B2 | 3/2010 | Dalal et al. | |
| 7,711,916 B2 | 5/2010 | Chandrasekaran et al. | |
| 7,752,392 B1 | 7/2010 | Roy et al. | |
| 7,802,248 B2 | 9/2010 | Broquere et al. | |
| 7,809,914 B2 | 10/2010 | Kottomtharayil et al. | |
| 7,810,092 B1 | 10/2010 | van Rietschote et al. | |
| 7,865,686 B2* | 1/2011 | Akimoto | G06F 9/5077 711/170 |
| 7,873,700 B2 | 1/2011 | Pawlowski et al. | |
| 7,987,335 B1 | 7/2011 | Dickinson et al. | |
| 8,042,108 B2 | 10/2011 | Suwarna | |
| 8,103,776 B2 | 1/2012 | DeHaan | |
| 8,392,838 B2 | 3/2013 | Chawla | |
| 8,549,518 B1 | 10/2013 | Aron et al. | |
| 8,601,473 B1 | 12/2013 | Aron et al. | |
| 8,812,566 B2 | 8/2014 | Aizman et al. | |
| 8,850,130 B1 | 9/2014 | Aron et al. | |
| 8,863,124 B1 | 10/2014 | Aron | |
| 2002/0188592 A1 | 12/2002 | Leonhardt et al. | |
| 2003/0110263 A1* | 6/2003 | Shillo | 709/226 |
| 2003/0217131 A1 | 11/2003 | Hodge et al. | |
| 2004/0078186 A1 | 4/2004 | Nair et al. | |
| 2004/0148360 A1 | 7/2004 | Mehra et al. | |
| 2005/0246345 A1 | 11/2005 | Lent et al. | |
| 2006/0010502 A1 | 1/2006 | Mimatsu et al. | |
| 2006/0031547 A1 | 2/2006 | Tsui et al. | |
| 2006/0190552 A1 | 8/2006 | Henze et al. | |
| 2007/0033367 A1* | 2/2007 | Sakarda et al. | 711/170 |
| 2007/0094348 A1 | 4/2007 | Scheidel et al. | |
| 2007/0283343 A1 | 12/2007 | Aridor et al. | |
| 2008/0072222 A1 | 3/2008 | Bantz et al. | |
| 2008/0086728 A1 | 4/2008 | Lam et al. | |
| 2008/0163171 A1 | 7/2008 | Chess et al. | |
| 2008/0196087 A1 | 8/2008 | Ranjit | |
| 2008/0256538 A1 | 10/2008 | Carter et al. | |
| 2009/0063528 A1 | 3/2009 | Yueh | |
| 2009/0063795 A1 | 3/2009 | Yueh | |
| 2009/0083375 A1 | 3/2009 | Chong et al. | |
| 2009/0089781 A1 | 4/2009 | Shingai et al. | |
| 2009/0113031 A1 | 4/2009 | Ruan et al. | |
| 2009/0172136 A1 | 7/2009 | Schulz et al. | |
| 2009/0172666 A1 | 7/2009 | Yahalom et al. | |
| 2009/0210869 A1 | 8/2009 | Gebhart et al. | |
| 2009/0216828 A1 | 8/2009 | Gebhart et al. | |
| 2009/0228629 A1 | 9/2009 | Gebhart et al. | |
| 2009/0228669 A1 | 9/2009 | Slesarev et al. | |
| 2009/0241192 A1 | 9/2009 | Thomas | |
| 2009/0265706 A1 | 10/2009 | Golosovker et al. | |
| 2009/0276774 A1 | 11/2009 | Kinoshita | |
| 2009/0287886 A1 | 11/2009 | Karstens | |
| 2009/0300605 A1* | 12/2009 | Edwards et al. | 718/1 |
| 2010/0017456 A1 | 1/2010 | Gusler et al. | |
| 2010/0017801 A1 | 1/2010 | Kundapur | |
| 2010/0031079 A1 | 2/2010 | Gupta et al. | |
| 2010/0042719 A1 | 2/2010 | Kinoshita | |
| 2010/0058106 A1 | 3/2010 | Srinivasan et al. | |
| 2010/0058328 A1 | 3/2010 | Dehaan | |
| 2010/0058332 A1 | 3/2010 | Dehaan | |
| 2010/0070978 A1* | 3/2010 | Chawla et al. | 718/105 |
| 2010/0082922 A1 | 4/2010 | George et al. | |
| 2010/0083249 A1 | 4/2010 | Gupta et al. | |
| 2010/0107160 A1* | 4/2010 | Srinivasan | G06F 21/57 718/1 |
| 2010/0153946 A1 | 6/2010 | Bhaskar et al. | |
| 2010/0161773 A1 | 6/2010 | Prahlad et al. | |
| 2010/0161922 A1 | 6/2010 | Sharp et al. | |
| 2010/0175064 A1 | 7/2010 | Brahmaroutu | |
| 2010/0223610 A1 | 9/2010 | Dehaan et al. | |
| 2010/0228903 A1* | 9/2010 | Chandrasekaran | G06F 9/45558 711/6 |
| 2010/0235828 A1 | 9/2010 | Nishimura et al. | |
| 2010/0251363 A1 | 9/2010 | Todorovic | |
| 2010/0306173 A1 | 12/2010 | Frank | |
| 2010/0306445 A1 | 12/2010 | Dake | |
| 2010/0306467 A1 | 12/2010 | Pruthi et al. | |
| 2010/0306770 A1 | 12/2010 | Frank | |
| 2010/0313200 A1 | 12/2010 | Rozee et al. | |
| 2011/0016467 A1 | 1/2011 | Kane | |
| 2011/0022574 A1 | 1/2011 | Hansen | |
| 2011/0022883 A1 | 1/2011 | Hansen | |
| 2011/0078433 A1 | 3/2011 | Bert | |
| 2011/0078682 A1 | 3/2011 | Doan et al. | |
| 2011/0099187 A1 | 4/2011 | Hansen | |
| 2011/0106769 A1 | 5/2011 | Baptist et al. | |
| 2011/0153697 A1 | 6/2011 | Nickolov et al. | |
| 2011/0179413 A1* | 7/2011 | Subramanian et al. | 718/1 |
| 2011/0184993 A1 | 7/2011 | Chawla et al. | |
| 2011/0185292 A1 | 7/2011 | Chawla et al. | |
| 2011/0185355 A1 | 7/2011 | Chawla et al. | |
| 2011/0239213 A1* | 9/2011 | Aswani et al. | 718/1 |
| 2011/0276620 A1 | 11/2011 | Pirzada et al. | |
| 2011/0276963 A1 | 11/2011 | Wu et al. | |
| 2011/0296393 A1 | 12/2011 | Vidal et al. | |
| 2012/0011500 A1* | 1/2012 | Faraboschi et al. | 718/1 |
| 2012/0304171 A1* | 11/2012 | Joshi et al. | 718/1 |
| 2013/0007735 A1* | 1/2013 | Bookman | G06F 9/4445 718/1 |
| 2013/0151653 A1* | 6/2013 | Sawicki | G06F 15/17331 709/216 |
| 2013/0179648 A1* | 7/2013 | Yagame | G06F 3/0604 711/156 |

OTHER PUBLICATIONS

J Hansen and E Jul, "Lithium: Virtual Machine Storage for the Cloud", ACM Symposium on Cloud Computing, Jun. 2010, online: <http://labs.vmware.com/downlaod/37/>.

* cited by examiner

SYSTEMS, METHODS AND DEVICES FOR MANAGEMENT OF VIRTUAL MEMORY SYSTEMS

CROSS-REFERENCE TO RELATED APPLICATION

This application is claims benefit from U.S. Provisional Application Ser. No. 61/610,691 entitled "Systems, Methods and Devices for Management of Virtual Memory Systems" filed on Mar. 14, 2012, which is hereby incorporated in its entirety by reference.

FIELD OF THE INVENTION

The present invention relates to systems, methods and devices for management of virtual memory components for storing computer readable information for use by at least one first computing device.

BACKGROUND

Hardware virtualization allows a single physical computer to be divided into a number of virtual machines (which may be referred to hereinafter as "VMs"). To achieve this partitioning, a low-level piece of software, called a virtual machine monitor (which may be referred to hereinafter as "VMM"), which in some cases may be a hypervisor, is installed on the physical computer, and then conventional software including operating systems and applications are installed into the resulting VM-based environments as if they were their own physical computers. Over the past decade, virtualization has transformed enterprise computing: VMware™, Microsoft™, and Citrix™ all sell hypervisor products and a significant percentage of enterprises are using virtualization to manage their server rooms. Amazon™'s Elastic Compute Cloud™ (EC2™—see, for example, aws.amazon.com) and other competitive services, such as that offered by Rackspace™, are large-scale internet-based hosting systems in which anyone with a credit card can lease virtual machine instances, allowing them to have continuously-running, internet-connected computing resources.

A major benefit to virtualization is that of utilization: virtualization takes high-performance physical computers from which associated resources largely sit idle or operate at a sub-maximal level, and allows workloads from many servers to be packed onto those physical computers. Enterprises accordingly make better use of their hardware, and also gain an interface that allows IT departments to account for the use of IT resources back to the organizational units within a company that are consuming them. From a revenue perspective, virtualization's efficiency makes IT spending go further, and the accountability allows IT spending to be associated with its actual consumers.

Virtualized environments pertaining to data storage infrastructure that store data has historically experienced two challenges, among others. These include, but are not limited to (1) the cost of storage for virtualized environments, and (2) the flexibility with which that data is controlled and managed by administrators.

From a cost perspective, a common approach to providing storage in a virtualized environment is to buy enterprise storage hardware, as sold by vendors such as NetApp™, EMC™, and HP™. The reasoning for this purchase is that densely packed virtual machines need a great deal of storage bandwidth and capacity, and it is desirable to have this data stored in a durable and reliable manner. Further, virtualization deployments generally free VMs from having to run on a single, specific server; instead they may be booted on whatever server has available resources and may even move from one server to another using a technique called "live migration", such as, for example, VMWare™'s vMotion™. For this to work, the disks that these VMs use must be visible to all the physical hosts in the virtualized infrastructure. Storing all their data on a single, shared storage target achieves this property because the storage used by such a VM is uniformly accessible by all of the servers on which it might potentially be migrated to.

Among other drawbacks, these enterprise storage targets are very expensive. They can often represent an estimated 40% of capital expenditures on a new virtualization deployment (the servers and VMWare™ licenses combine to form another 25%), and are among the highest-margin components of capital expenditure in enterprise IT spending. Enterprise Storage Area Networks (SANs) and Network Attached Storage (NAS) devices, which are typically utilized as memory resources for VMs and other virtual computing applications, are very expensive, representing probably the highest margin computer hardware available in a datacenter environment.

Some systems, such as Veritas™'s cluster volume manager (to name just one), attempt to mitigate this cost by consolidating multiple disks on a host and or aggregated disks within a network to provide the appearance of a single storage target. A small number of systems have structured this approach using virtual appliances: delivering the storage software as a virtual machine that runs on the same physical server as the disks that are being aggregated. Examples include, VMware™'s Virtual Storage Appliance™, Lefthand Networks™' storage appliance, and VMware™'s internal "CloudFS™" or "Lithium" project, which was both released as open source software and published as an academic paper at the Symposium on Cloud Computing by Jacob Gorm Hansen and Eric Jul entitled "Lithium: Virtual Machine Storage for the Cloud" and presented at ACM SoCC in 2010 in Indianapolis, Ind., USA, which is incorporated herein by reference. While many such systems perform some degree of consolidating memory resources, they generally use simple, established techniques to unify a set of distributed memory resources into a single common pool. They provide little or no differentiation between dissimilar resource characteristics, and provide little or no application- or data-specific optimizations with regard to performance. Put simply, these related systems strive for the simple goal of aggregating distributed resources into the illusion of a single homogenous resource.

From a storage flexibility perspective, hardware components are generally virtualized in their entirety. A VM receives some number of virtual CPUs and some memory. It also receives one or more virtual disks. At the virtualization layer, this virtual disk is generally thought of as a single file, and stored in a well-known format such as Microsoft™'s Virtual Hard Disk (VHD) or VMware™'s VMDK. The contents of this file are that of an entire virtual disk. It contains a file system, an operating system (OS), one or more applications, and one or more data files. To the virtualization layer, however, the file is generally treated as a single cohesive unit that cannot be broken apart. One reason for this is that while an operating system is running, it makes assumptions that it is the only entity that is reading and writing to its disk. This assumption allows the OS to cache the file system state in memory and avoid reading the disk on every single access. If a third party were to try to read that disk while the VM was running, it would appear slightly older than the version that the VM sees, and if they were to write to the disk, they would violate the OS assumptions and would likely corrupt its contents. The inability to work at a sub-image granularity limits functionality.

Software from Softricity™ and Thinapp™ has looked at managing application deployment using file-level techniques that attempt to work at lower levels of granularity. For example, Moka5™ has developed techniques to decide which files to overwrite or persist in upgrading virtual machine-based appliances. These systems focus dominantly on the problem of upgrading underlying OS and application software, while preserving modifications and customizations that users of the system have made over time. Other examples include synchronization services such as Dropbox™, SugarSync™, and Mozy™, which provide solutions that replicate a subset of files from a notebook or desktop computer to cloud-based storage. However, none of these solutions allow system-based policy establishment about what and where to replicate/place data to be set at an organization-wide granularity. Moreover, prior systems have been limited in providing user-facing access to data management for virtualized memory systems. Some related attempts include NetApp™, which exposes a ".snapshot" folder in which users can access backups of their data on the NFS or CIFS filer. Employs technology related to allowing users to access the contents of virtual machines through a third-party interface, such as described in U.S. patent application Ser. Nos. 12/694,358, 12/694,368 and 12/694,383, each of which is incorporated herein by reference.

Managing the storage of data (documents, databases, email, and system images such as operating system and application files) is generally a complex and fragmented problem in business environments today. While a large number of products exist to manage data storage, they tend to take piecewise solutions at individual points across many layers of software and hardware systems. The solutions presented by enterprise storage systems, block devices or entire file system name spaces, are too coarsely grained to allow the management of specific types of data (e.g. "All office documents should be stored on a reliable, high-performance, storage device irrespective of what computer they are accessed from"). It is difficult or impossible to specify other fine-grained (i.e. per-file) policy describing the encryption, durability, or performance properties of data.

In some exemplary prior art systems, on physical computing devices, an operating system will generally use a file system, such as NTFS or VMFS, to permit the physical computing device to access and write files and directories to physical memory resources. For a virtual computing device, in general, a physical computing device will have operating on it a virtual machine monitor, sometimes also known as a hypervisor, such as VMware™ ESX™, Citrix™ XenServer™ or Microsoft™ Hyper-V™, which creates an instance of the virtual computing device on the physical computing device and manages communication from the virtual computing device to the associated virtual memory component. On current systems in general, the virtual memory component is instantiated from the physical memory component on the physical computing device on which the virtual computing device is running and a virtual memory file system (VMFS) is created on the virtual memory component by the virtual machine monitor (in some cases, the virtual machine monitor may include VMware™). In general, the user accesses the virtual machine monitor through a browser, for example, and the virtual machine monitor virtualizes some of the physical memory resources as storage memory, presenting some or all of the virtual memory resources available from, for example, a physical hard disk, as a virtual disk to the virtual computing device. The virtual machine monitor then takes instructions requests issued by the virtual computing device for the virtual disk and translates the instructions (e.g. read/write/update) from the virtual computing device for the virtual memory component, and then from the virtual memory component to the physical memory component. As virtual computing devices may move from one physical computing device to another as they run, it is common practice to use central shared storage rather than local disks on individual physical computing devices. In this common approach, a virtualization deployment will include a set of physical computing devices, all of which are connected to one or more storage arrays, which may be thought of as providing a single and shared physical memory component for all coupled physical computing devices. Typically, a local disk (i.e. local physical memory resources) is used with VMware™-instantiated virtual machines, which are actually restricted to running on the host machine. It is much more common with VMware™ to use a central, shared storage device (a "LUN" in enterprise storage terminology), which appears to be a single local disk that is connected to all physical machines in the cluster. VMware™'s new Virtual Storage Appliance allows local disks to be used for cluster sizes of two (2) or three (3) memory provisioning modules. It does this by pair wise mirroring entire physical disks between two physical computers.

The examples and objectives described above are included solely to advance the understanding of the subject matter described herein and are not intended in any way to limit the invention to aspects that are in accordance with the examples or improvements described above.

SUMMARY OF INVENTION

The present invention is directed to systems, methods and devices for managing, storing and accessing information stored in at least one instance of virtual memory components for use by at least one first computing device, the system comprising at least one physical computing device, each physical computing device being communicatively coupled over a network and comprising access to a physical memory component, an operating system, a virtual machine monitor, and a virtual memory storage appliance; the virtual memory storage appliances on each physical computing device being configured to communicate with the operating system and the virtual machine monitor and being configured to associate physical memory resources of the at least one physical memory component available over the network with an instance of a virtual memory component accessible to one of the at least one first computing device, each of the virtual memory storage appliances being configured to communicate with one another.

In one aspect of the subject matter disclosed herein there are provided systems, methods and devices for management of instances of virtual memory components for storing computer readable information for use by at least one first computing device, the systems, methods and devices relating to at least one physical computing device, each physical computing device being communicatively coupled over a network and comprising: a physical memory component, a computing processor component, a virtual machine monitor, and a virtual memory storage appliance; at least one of the virtual memory storage appliance being configured to (a)

accept memory instructions from the at least one first computing device, (b) instantiate and communicate with instances of virtual memory components, (c) allocate memory resources from at least one physical memory component for use by at least one of the virtual memory component, optionally according to a pre-defined policy; and (d) implement memory instructions on the at least one physical memory component.

In some aspects, there are provided systems, methods and devices for storing, accessing and using information stored in virtual memory components by at least one first computing device, the systems, methods and devices comprising at least one physical computing device that are communicatively coupled over a network and comprising at least one physical memory component, wherein each of the at least one physical computing device has installed thereon a virtual memory storage appliance that is configured to allocate and prioritize at least one priority memory resource from the at least one physical memory component for the at least one priority data type, the priority memory resources sharing at least one pre-determined memory characteristic and the priority data types sharing at least one pre-determined data type characteristic.

In some aspects, there are provided systems, methods and devices for storing, accessing and/or using information stored in virtual memory components by at least one first computing device, the systems, methods and devices comprising at least one physical computing device that are communicatively coupled over a network and comprising at least one physical memory component, wherein each of the at least one physical computing device have installed thereon a virtual memory storage appliance that is configured to transform the composition, format and modality of data between a first mode and a second mode, wherein the first mode is any composition, format and modality that facilitates storage on a particular at least one physical memory component on which the data is stored, and the second mode is any composition, format and modality that facilitates access or use of the data by the at least one first computing device.

Some aspects of the instantly disclosed subject matter seek to reduce the use of enterprise storage targets in virtualization deployments by taking advantage of local hard disks, installed in at least one physical computer that are communicatively coupled across a network to the computing device or devices, including both physical and virtual machines, that would otherwise utilize the enterprise storage target. Some subject matter herein relates to the use of a "virtual memory storage appliance", which, in some aspects, can be a special purpose virtual machine, or an image thereof, that is installed on every physical machine that may contribute memory resources, and as a group combines all the resources of the available hard disks into a single, managed storage target. This approach cuts costs, allowing customers to pay for disks in their servers as opposed to expensive enterprise filers. In some aspects, different methods of storing information on different types of physical memory devices, as disclosed herein, can be implemented to take advantage of various storage characteristics of different storage media that may be available, even for the same data objects (i.e. different sub-objects relating to a single data object can utilize different physical storage media according to different storage methods, each of such method being configured to maximize operational characteristic for the specific media upon which a given sub-object is stored). For example, solid-state disks (SSDs) and other high-performance nonvolatile memories such as PCIe-based flash cards and phase-change memory technologies are all emerging storage technologies that demonstrate the potential for very high directly attached (i.e. DAS) storage performance.

In some aspects of the instant invention, there are provided methods of managing of at least one instances of virtual memory component for use by at least one first computing device, the method comprising the steps of: providing a plurality of physical computing devices, each of the physical computing devices being communicatively coupled over a network, and having access to physical memory components, in some cases the physical memory components being heterogeneous across the plurality, and an operating system, and a virtual machine monitor; instantiating on each physical computing device a virtual memory storage appliance, the virtual memory storage appliance being configured to communicate with the operating system and the virtual machine monitor and being communicatively coupled with virtual memory storage appliances in other physical computing devices; and managing, by the virtual memory storage appliance, memory instructions between any first computing device and at least one virtual memory component by associating memory resources on any physical memory components with the virtual memory components.

In some aspects of the instantly disclosed subject matter, there is provided a device for managing at least one virtual memory component instance using a virtual memory storage appliance, said device comprising: an interface for access to at least one virtual machine; a virtual machine monitor for managing said virtual computing machines; and a virtual memory storage appliance instance for virtualizing at least one storage resource on at least one physical computing device that are communicatively coupled to the device and have instantiated thereon other virtual memory storage appliances, wherein said virtual memory storage appliance instance is interposed between the virtual machine monitor and an operating system running on the device in each such physical computing device.

In some aspects of the instantly disclosed subject matter there is provided virtual memory storage appliances for managing at least one virtual memory component instance, the virtual memory storage appliance being configured to be interposed between an operating system of a computing device and an application layer of the computing device and be communicatively coupled to at least one other virtual memory storage appliance, wherein the at least one virtual memory storage appliance is further configured to perform steps selected from a group consisting of: (a) accept memory instructions from at least one first computing device, (b) instantiate instances of virtual memory components, (c) allocate memory resources from at least one physical memory component for use by the at least one virtual memory component; (d) implement memory instructions on the at least one physical memory component; and (e) arbitrate memory instructions directed to physical memory component.

In some aspects of the instantly disclosed subject matter there are provided systems, methods and devices for managing, storing and accessing information stored in at least one instances of virtual memory component for use by at least one first computing device, the system comprising at least one physical computing device, each physical computing device being communicatively coupled over a network and comprising access to a physical memory component, an operating system, a virtual machine monitor, and a virtual memory storage appliance; the virtual memory storage appliances on each physical computing device being configured to communicate with the operating system and the virtual machine monitor and being further configured to allocate at least one first memory resource from any of the at least one physical memory components= of the physical computing devices for at least one first data type, a first of the at least one memory resource sharing at least one pre-determined memory characteristic and the at least one first data type sharing at least one pre-determined data type characteristic.

In some aspects of the instantly disclosed subject matter there are provided systems and methods for managing, storing and accessing information stored in at least one instances of virtual memory component for use by at least one first computing device, the system comprising at least one physical computing device, each physical computing device being communicatively coupled over a network and comprising access to a physical memory component, an operating system, a virtual machine monitor, and a virtual memory storage appliance; the virtual memory storage appliances on each physical computing device being configured to communicate with the operating system and the virtual machine monitor and being further configured to transform the composition of data between a first mode and a second mode, wherein the first mode is any composition that facilitates storage on a particular of the at least one physical memory component on which the data is stored, and the second mode is any mode that facilitates use of the data by the at least one first computing device.

In some aspects of the instantly disclosed subject matter there are provided uses of the systems disclosed herein for the management of physical memory resources associated with at least one virtual memory components.

In some aspects of the instantly disclosed subject matter, there is provided a method for managing at least one virtual memory component instance by a virtual memory storage appliance, said method comprising, accepting memory instructions from at least one computing device; instantiating the at least one virtual memory component instance; allocating memory resources from at least one physical memory component for use by the at least one virtual memory component instance; and implementing memory instructions on the at least one physical memory component, optionally according to a pre-determined policy.

In some aspects of the instantly disclosed subject matter, there is provided a method of aggregating and managing data objects across a plurality of networked, heterogeneous storage devices using a virtual memory storage appliance, said method comprising: providing a device driver that redirects memory instructions between an operating system and associated memory resources to the virtual memory storage appliance; and providing a software module that analyzes at least one object request semantic of a file system transaction, for enabling the virtual memory storage appliance to propagate the transaction to the at least one virtual memory component instance.

Some aspects of the instantly disclosed subject matter combine multiple, distributed disks into a single aggregate virtual memory storage facility; detect and diagnose performance problems across any of the physical machines on which the physical memory resources are located and accessible to; safely distribute data and are configured to recover from failures of individual components on the system; and cache and replicate data to move storage to maximize benefits relating to the available storage means, methodologies and media for at least one of the physical devices that enables storage for a given virtual memory component.

In some aspects, there is provided a capability to break apart stored data objects, such as disk images or files, that represent stored information and then manage such objects or sub-objects at the granularity of such broken apart data objects or sub-objects. The data objects may include granular units of information such as individual files or specific entries within a file. Such granularity provides for a capacity to place important, frequently used files, like databases, on faster and more durable storage; encrypt user documents and take more frequent backups of them; synchronize a subset of files to file sharing services such as Dropbox™; allow users to use, index and search for files across many VMs; "compose" images that represent stored information by combining independently maintained manifests of OS, application, and data files. In some aspects, there is provided subject matter that can gain access to the contents of a running VM; compose complete file systems from individual, separate, lists of files; redirect a subset of a running file system to use a different storage target; resolve or traverse OS-specific challenges, such as combining configuration state stored in the windows registry.

Some aspects of the instantly disclosed subject matter provide for, inter alia: (a) transparent clustering and/or tiering of collections of disks, wherein the clustering and/or tiering is based on measured performance and not specified manually, and a log-based object storage system which adapts its layout to take advantage of different hardware characteristics simultaneously; (b) allowing sub-objects to be placed across tiers as a policy that allows for subsections of objects to be placed on different storage tiers and data to be moved back and forth between tiers based on access patterns; (c) dynamic presentation of objects to different consumers by live or real-time translation of virtual memory device image files from one format to another (e.g. to or from VHD, VMDK, raw block device, among others), and real-time management of composition of file systems with specific contents (e.g. all word documents) and presentation of those contents at both a file (NFS/CIFS) and synthesized block and file-system-level (NTFS/EXT2); and (d) specialized use of hardware for enhanced performance in virtual environments by splitting the storage data path out from metadata updates and allowing a virtual to make direct but safe requests to virtualized disks. These techniques make use of emerging technologies such as SR-IOV and IOMMUs that provide virtual interfaces directly between the physical memory resources that are associated with the virtual memory components.

Some aspects of the instant invention may be directed to systems, methods and devices for providing efficient use of memory resources while optimizing certain pre-determined performance characteristics. This may be achieved in some aspects by integrating heterogeneous types of available memory resources on physical machines that are communicatively coupled across a network, collecting and incorporating data and workload information from across layers and available resources, and converging all of these properties into integrated memory management systems, methods and devices.

Some aspects of the instant invention may be directed to systems, methods and devices for aggregating distributed resources into the illusion of a single homogenous resource and which may, for example, manage conflicts, implement policy objectives, and optimize operational objectives, by managing the utilization of any or all of the available physical memory resources across at least one cluster of communicatively coupled computing devices according to the operational characteristics of such available physical memory resources and usage characteristics of the data objects.

The examples and objectives described above are included solely to advance the understanding of the subject matter described herein and are not intended in any way to limit the invention to aspects that are in accordance with the examples or improvements described above.

BRIEF DESCRIPTION OF THE FIGURES

The invention, both as to its arrangement and method of operation, together with further aspects and advantages thereof, as would be understood by a person skilled in the art of the instant invention, may be best understood and otherwise become apparent by reference to the accompanying schematic and graphical representations in light of the brief but detailed description hereafter.

DETAILED DESCRIPTION OF THE INVENTION

Figure 1:
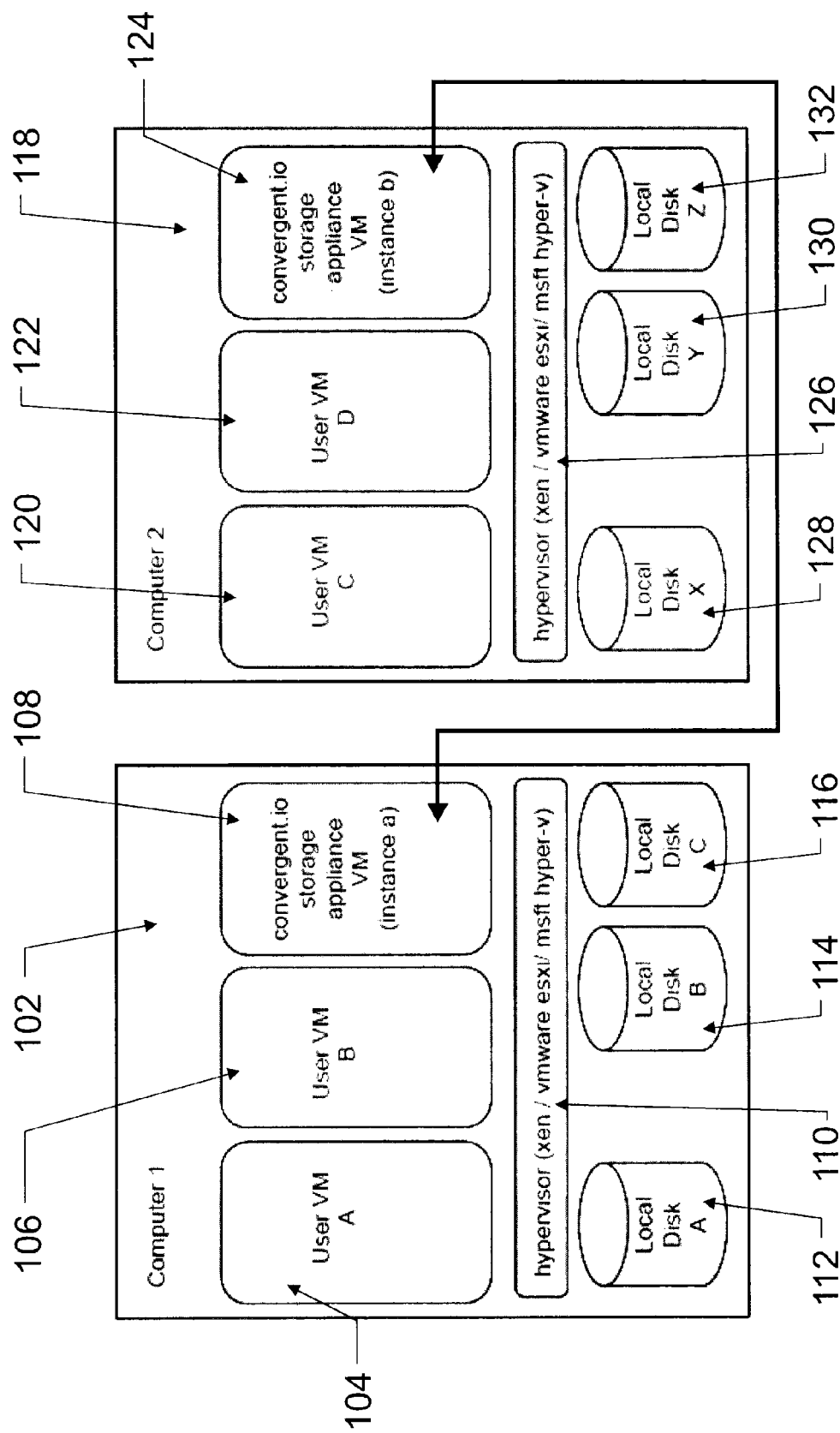
FIG. 1 is a schematic diagram of one aspect of the instantly disclosed subject matter and is representative of two exemplary physical devices that reside communicatively coupled on a network of an aspect the instantly disclosed subject matter.

The present invention will now be described more fully with reference to the accompanying schematic and graphical representations in which representative aspects of the present invention are shown. The invention may however be embodied and applied and used in different forms and should not be construed as being limited to the exemplary aspects set forth herein. Rather, these aspects are provided so that this application will be understood in illustration and brief explanation in order to convey the true scope of the invention to those skilled in the art. Some of the illustrations include detailed explanation of operation of the present invention and as such should be limited thereto.

As used herein, the term "virtual," as used in the context of computing devices, may refer to one or more computing hardware or software resources that, while offering some or all of the characteristics of an actual hardware or software resource to the end user, is a simulation of such a physical hardware or software resource. Virtualization is the process of, or means for, instantiating simulated or virtual computing elements such as, inter alia, hardware platforms, operating systems, memory resources, network resources, or any hardware resource, software resource, interfaces, protocols, or other element that would be understood as being capable of being rendered virtual by a worker skilled in the art of virtualization. Virtualization can sometimes be understood as abstracting the physical characteristics of a computing platform or device from users or other computing devices or networks, and instead providing access to an abstract equivalent for the users, other computers or networks, sometimes embodied as a data object or image recorded on a computer readable medium. The term "physical," as used in the context of computing devices, may refer to actual or physical computing elements (as opposed to virtualized abstractions of same).

As used herein, a "computing device" may include virtual or physical computing device, and also refers to any device capable of receiving and/or storing and/or processing and/or providing computer readable instructions or information.

As used herein, "memory" may refer to any resource or medium that is capable of having information stored thereon and/or retrieved therefrom. A "memory resource" can be a memory component, or an element or portion thereof, that is used or available to be used for information storage and retrieval. Memory, as used herein, can refer to any of the components, resources, media, or combination thereof, that retain data, including what may be historically referred to as primary (or internal or main memory due to its direct link to a computer processor component), secondary (external or auxiliary as it is not always directly accessible by the computer processor component) and tertiary storage, either alone or in combination, although not limited to these characterizations. Although the term "storage" and "memory" may sometimes carry different meaning, they may in some cases be used interchangeably herein.

As used herein, a "virtual memory component" refers to memory resources that are virtual in nature, rather than physical. A virtual memory component may refer to a virtualization of any one or more memory resources configured to simulate or be an abstraction of one or more available physical memory resources across one or more physical memory components as a single memory component. This may be achieved in some aspects by combining fragmented or distributed physical memory resources. The combined physical memory resources may be the same or different types of resources, including memory resources that provide rapid and/or temporary data storage, such as RAM (Random Access Memory), SRAM (Static Random Access Memory), DRAM (Dynamic Random Access Memory), SDRAM (Synchronous Dynamic Random Access Memory), CAM (Content-Addressable Memory), or other rapid-access memory, or more longer-term data storage that may or may not provide for rapid access, use and/or storage, such as a disk drive, flash drive, optical drive, SSD, other flash-based memory, PCM (Phase change memory), or equivalent. A given virtual memory component may thus include, in whole or in part, virtualized volatile memory devices, non-volatile memory devices, or both volatile and non-volatile memory devices acting in concert. Virtual memory components may or may not adopt the same characteristics of the physical memory resources to which they are associated.

A "computing processor component" refers in general to any component of a physical computing device that performs arithmetical, logical or input/output operations of the device or devices, and generally is the portion that carries out instructions for a computing device. The computing processor component may process information for a computing device on which the computing processor component resides or for other computing devices (both physical and virtual). It may also refer to one or a plurality of components that provide processing functionality of a computing processor component, and in the case of a virtual computing device, the computing processor component functionality may be distributed across multiple physical devices that are communicatively coupled.

The instantly disclosed subject matter consists of methods, processes, systems and devices for systems, methods and devices for management of instances of virtual memory components for storing computer readable information for use by one or more first computing devices, the systems, methods and devices comprising or relating to one or more physical computing devices, each physical computing device being communicatively coupled over a network and comprising: a physical memory component, a computing processor component, a virtual machine monitor, and a virtual memory storage appliance; one or more of the virtual memory storage appliances being configured to (a) accept memory instructions from one or more first computing devices, (b) instantiate and/or communicate with instances of virtual memory components, (c) allocate memory resources from one or more physical memory components for use by any of the one or more virtual memory components, optionally according to a pre-defined policy; and (d) implement memory instructions on the one or more physical memory components.

In some aspects, the one or more first computing devices refer to computing devices that utilize or are capable of utilizing the memory resources of the virtual memory components instantiated and managed according to the instantly disclosed subject matter. The first computing devices in some aspects may be virtual or physical computing devices. The first computing device may also be one of the one or more physical computing devices that comprise the systems, methods and devices disclosed herein, although in some aspects the first computing devices may have access to virtual memory components that are instantiated on, and/or by, other computing devices (which in turn may or may not be one of the physical computing devices).

In some aspects, the physical memory components of the physical computing devices can include any physical memory resources to which a physical computing device on the communicatively coupled network can use or to which it otherwise has access. It may in some aspects include primary memory resources that are directly accessible to a computer processor component, such as, but not limited to, RAM, registers, and cache memory. In some aspects, these components may include one or more secondary memory resources that are not as directly accessible by a computer processor, including hard disk drives, optical discs, SSDs, electronic discs, flash memories, floppy drives, and magnetic tapes or drives, among other physical media that would be known to a person skilled in the art. Likewise, other physical memory components that have not yet been developed or be widely known could be used without departing from the scope of the subject matter described herein, insofar as such components are the physical memory resources that are used by a physical computing device to store and read information. The physical memory components may have any of a number of storage characteristics, which may vary broadly across all of the physical storage components of all of the various physical computing devices in the system. These may include, without limitation, the volatility of a memory resource (which can be used to describe the ability for memory resources to store data during periods with and without a supply of electrical power), persistence (the ability to store data when a given process has ended), whether memory is dynamic or static (an indication of whether memory requires that information be refreshed, re-read or re-written in order to persist), mutability (capability of memory to use the same resources for both reading and writing information, read-only, or variations in speed of reading and writing relative to one another, e.g. information may be written to flash memory slowly but read much more quickly), accessibility (random access to memory resources on a given memory component versus sequential access), addressability (describing whether units of memory resources are addressable according to their location on a memory component, existence within a file structure for which, for example, an operating system associated with the physical computing device provides a file system abstraction to provide storage location information, or content-addressable in which the content of the information is used to determine an address for storage), capacity (including overall capacity and density characteristics), speed or performance (including the latency, which refers to the time a memory component takes to access a memory location, and throughput, which can be used to refer to the amount of time it takes for reading or writing to memory location on a particular type of memory resource), reliability (the degree to which memory instructions, such as read, write, update, can be carried out without error) and energy use (which would describe the overall energy consumption used by a memory component and whether a component may have capabilities to reduce energy usage during, for example, periods of activity or of inactivity). In some aspects, physical memory components may have any number of other characteristics not disclosed herein that impact the provision of memory resources but would still be within the scope of the subject matter disclosed herein provided the system can, as a general matter, associate different memory device characteristics with different physical or memory components, and then adapt modes of utilization, such as methods of implementing memory instructions, to adjust or control such characteristics.

In some aspects, the virtual machine monitor may refer to a program that allows multiple operating systems, typically running on virtual computing devices that have been instantiated on the computing device on which the virtual machine monitor is running, to share resources or functionality from one or more hardware hosts. The virtual machine monitor permits a given operating system to appear to have access to the host computing device processor, memory, and other resources all to itself, while the virtual machine monitor is in fact controlling the host computing processor and resources, allocating what is needed to each virtual operating system in turn and making sure that the virtual operating systems do not disrupt each other. In some aspects, the virtual machine monitor may comprise a hypervisor.

In aspects of the instantly disclosed subject matter, each of the one or more physical computing devices comprises a virtual memory storage appliance. The virtual memory storage appliance is, in some aspects, a program running on a physical computing device that is interposed between the virtual machine monitor (application layer) and the operating system layer. Being interposed means that the virtual memory storage appliance is capable of receiving instructions from one element and, in some cases amending or adjusting such instructions, and passing such instructions to another element. In this way, for example, memory instructions (which may refer to any instructions for reading from, accessing from, writing to, updating or otherwise using memory resources), that would ordinarily originate at a virtual memory component and be processed by the virtual machine monitor to be implemented at the host computing device processor and memory resources thereof (which may, in some aspects, include a virtual memory component instantiated on the host computer by the virtual machine monitor), are instead directed, via the virtual machine monitor, to the virtual memory storage appliance. The virtual memory storage appliance is, in some aspects, communicatively coupled via a private network to all other virtual memory storage appliances running on other physical computing devices of the instant system. The virtual memory storage appliance on any such physical computing devices is configured to instantiate and communicate with instances of virtual memory components to be used by a first computing device (which may be any one of the physical computing devices on which the virtual memory storage device is running, another computing device being communicatively coupled to that physical computing device, or a virtual computing device running on or communicatively coupled with one of the foregoing).

Some aspects of the instantly disclosed subject matter may provide for clustering and tiering collections of physical memory resources that are not apparent to the computing device using the virtual memory component. The clustering and/or tiering of physical memory resources can be based on measured or desired performance, according to characteristics relating to the data associated therewith and/or characteristics of the physical memory resources to which such data is associated. The clustering and/or tiering does not require manual specification by the user, although in some aspects it may be possible to implement such specification in addition to the virtual memory management techniques disclosed herein. In some aspects, there is provided an object storage system which adapts its layout, in some cases dynamically or in real-time, with respect to the available physical memory resources across the network of communicatively coupled physical computing devices to take advantage of hardware characteristics that facilitate the achievement of any operational or policy objective, as optionally set by the user, administrator or enterprise.

In some aspects of the instantly disclosed subject matter, there are provided systems, methods and devices that allow for the creation and management of sub-objects to be stored across clusters or tiers of physical resources, wherein the sub-objects are subsections of objects relating to a virtual memory component or a virtual computing device, wherein the virtual memory storage appliances can manage such subsections of objects according to one or more predetermined policies, or to take advantage of hardware characteristics to achieve some operational objective, by placing the sub-object on multiple storage clusters or tiers and/or on different storage clusters or tiers from other associated sub-objects. An operational objective may include objectives such as increasing or decreasing speed, integrity, mutability, or any other memory or data characteristic disclosed herein or that would be known by a person skilled in the art to be affected by changes in operational parameters or methodologies. Moreover, such sub-objects and data associated therewith can be moved back and forth dynamically between clusters or tiers, or other physical memory resources, based on access patterns or availability of resources that would optimize achievement of operational or policy objectives.

The virtual memory storage appliance may, in some aspects, have one or more layers of functionality. One layer of functionality includes the layer which conducts instantiation of virtualized resources (including the virtual memory component) and oversees a distributed file system protocol which permits identification of, and communication with, the memory resources made available through the virtual memory storage appliance. Another layer of functionality in the virtual memory storage appliance is the replication and distribution layer, which oversees which physical memory components will have data distributed thereto or replicated thereon. This layer also manages, in some aspects, (a) which elements of data associated with a given virtual memory component are distributed to particular physical memory components across the system; and (b) the level and destination of replication of such data across the system. The next layer of functionality is the local storage layer which oversees how data stored on any particular physical memory component will be written or stored on each particular physical memory component (e.g. log-based), how it will be read or accessed (e.g. random access), and how it will be updated. The combination of these three layers permits optimization of any one or more operating parameters relating to data with a high degree of granularization for data management across the distributed physical memory resources that support any one or more virtual memory components. Moreover, any one or a combination of these layers of functionality can implement one or more pre-determined policies. Since each of the virtual memory storage appliances are interposed between the virtual machine monitor and the physical computing device operating system and resources, memory instructions which would ordinarily conflict, due to being sent by a plurality of virtual computing devices or virtual memory component sharing the same host operating system, can be intercepted and the physical memory resources, and its association with the host or guest operating system, can be managed by the virtual memory storage appliance to avoid conflict or other loss of integrity.

There is in some aspects a virtual memory storage appliance installed on every physical computing device that is communicatively coupled via a common network; the virtual memory storage appliances are shared across this network or another network. A given virtual memory storage appliance is accessed in a similar way to the way that the virtual computing device accesses the physical memory component in the prior systems described above. In some aspects of the instant system, the virtual machine monitor takes instructions, such as read/write instructions from a virtual computing device and, in communicating with the virtual memory component, the virtual machine monitor communicates with the virtual memory storage appliance, which in turn communicates with one or more virtual memory components. In this way the virtual memory components of the instantly disclosed subject matter appear to the user and the virtual computing device transparently, as if it had been instantiated from the local machine or other shared enterprise storage. The virtual memory storage appliance can then manage the virtual memory component across any of the physical computing devices running on the network that have a virtual memory storage appliance running on it (or alternatively to any physical memory component that is accessible by a physical computing device running on the network that has a virtual memory storage appliance), and thus the virtual memory component be an instantiation from resources available from any one or more physical memory component on the network.

In some aspects, a given virtual memory storage appliance has any one or more of three layers of functionality to provide management of virtual memory component. These may be referred to as the namespace layer; the replication/distribution layer; and the local storage layer. The namespace layer runs the protocols for communicating with the virtual machine monitors (using protocols such as NFS, or CIFS, or by direct integration with the file system within a virtual machine), and allows the naming, addressing and management of objects such as virtual memory component disks. The replication/distribution layer manages which one or more physical memory component will get data associated with a virtual memory component and runs policy associated with the business/storage parameters, and can use distributed disk management methodologies such as erasure coding, RAID, mirroring, or other distributed disk management methodologies as would be known to a worker skilled in the art. The local storage layer manages the instructions for reading/writing/updating to the local one or more physical memory components on which information may be stored, and can use a number of different memory instruction implementation methodologies. As one example of such memory instruction implementation methodologies, a log-based methodology may be used to implement memory instructions at the physical memory component level. By using different methodologies according to, for example, the fact that data or storage media may have certain shared characteristics in a given system can be leveraged to optimize operational parameters. For example, disk drives and SSD storage media may benefit from using different memory instruction implementation methodologies. Implementation of memory instructions according to a first methodology can be faster or safer on some types physical memory components from a given virtual memory component.

In some aspects, there is provided an interface for users and/or administrators to measure and/or account for the use of memory resources. In addition, the interface may be configured to implement one or more policies and/or operational objectives. Once implemented, the user or administrator may, via said interface, assess the effectiveness of the system in implementing the one or more policies and/or operational objectives and adjust operational parameters to increase said effectiveness. This may include, for example, increasing or decreasing (or otherwise prioritizing or avoiding) an association and/or affinity for certain data types or modes with certain memory types or modes. Other associations or adjustments of operational parameters as disclosed herein are also possible.

In some aspects, a user accesses the virtual machine monitor through a browser, for example, and the virtual machine monitor, instead of virtualizing physical memory resources on the host as storage memory, has its processing request for instantiation of a virtual memory component occur via a virtual memory storage appliance, which in turn instantiates a virtual memory component from available physical resources from any of a plurality of physical computing devices that are communicatively coupled to the host, and permits the virtual machine monitor to present some or all of the virtual memory resources available from, for example, various distributed physical hard disks, SSDs, optical drives, flash-based memory, PCM (Phase change memory), or other physical media available across the network, as a virtual disk to the virtual computing device. The virtual machine monitor then takes instruction requests issued by the virtual computing device for the virtual disk and translates the instructions (e.g. read/write/update) from the virtual computing device for the virtual memory component, where such instructions are communicated via the interposed virtual memory storage appliance, which in turn manages the implementation of such instructions across the previously associated physical memory resources. Alternatively, the virtual memory component can re-distribute the associations to available physical memory resources in real-time; which may occur, for example, to provide for changes in availability of physical memory resources having different operational characteristics, changes in operating requirements of the virtual memory component or the computing device or devices using said virtual memory component, changes in users or user requirements, or changes in operational objectives or policy objectives (e.g. optimizing speed of memory instruction implementation for certain types of files may become more desirable than optimizing security or redundancy). The virtual memory storage appliance, in some aspects, is transparent to the virtual machine monitor, while providing access to the distributed physical memory resources that maximizes the operational characteristics of each such physical memory resource and tailors the means of implementing the memory instructions to maximally achieve policy objectives or operational objectives.

FIG. 1 illustrates computer systems configured in accordance with one exemplary aspect of the present invention. Specifically, a first computer 102 hosts a plurality of user virtual machines 104 and 106 which are partially or fully managed by virtual machine monitor 110. A virtual memory storage appliance instance 108 is also running on the first computer 102, and may serve to virtualize and consolidate local storage resources associated with the computer, namely local hard disks 112, 114, and 116. Virtual memory storage appliance instance 108 is interposed between virtual machine monitor 110 and the operating system (not shown). As a result, the virtual machine monitor 110 communicates with the storage appliance instance 108 instead of directly to the operating system when identifying devices, replicating data, and controlling how data is read from and written to local hard disks 112, 114, and 116.

Likewise, a second computer system 118 hosts a virtual memory storage appliance instance 124, and a plurality of user virtual machines 120 and 122 which are partially or fully managed by virtual machine monitor 126. The virtual memory storage appliance instance 124 manages storage resources associated with local hard disks 128, 130, and 132. As with storage appliance instance 108, storage appliance instance 124 is interposed between virtual machine monitor 126 and the operating system (not shown) to manage storage devices and operations thereof, among other things. By virtue of the virtual memory storage appliances 108 and 124 being communicatively coupled by a private network, the various levels of functionality of said appliances 108 and 124 can cooperatively associate physical memory resources from any of the available local hard-disks 112, 114, 116, 128, 130, or 132 for use by virtual memory component on either computer system 102 or 118 (or on other physical computing devices having access thereto) according to one or more pre-determined policies or to optimize one or more operational objectives depending on the different relative characteristics and availability of each of the available local hard-disks 112, 114, 116, 128, 130, or 132.

Figure 2:
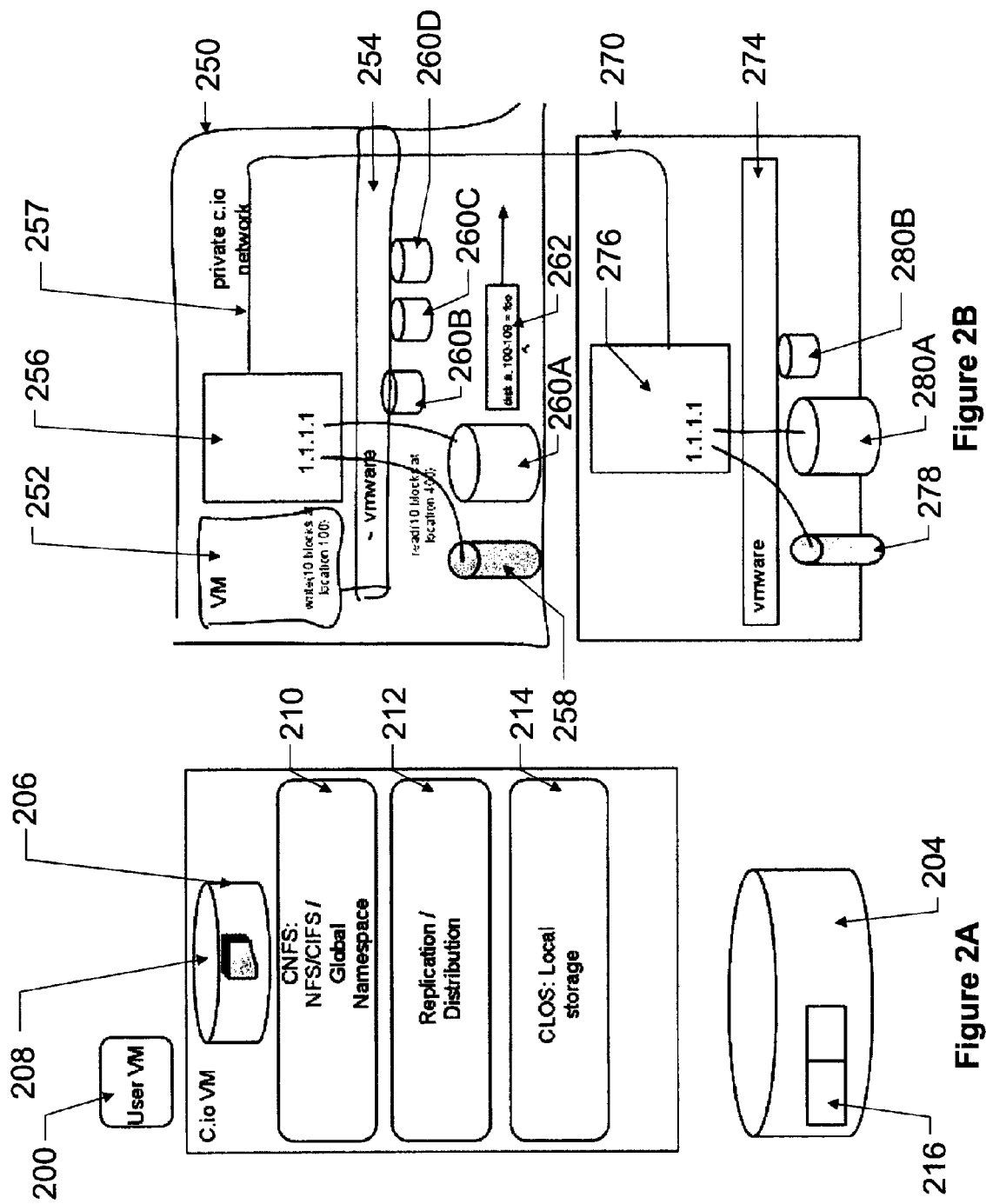
FIG. 2A is a representative figure of an aspect of a virtual memory storage appliance, showing constituent elements and relationships with a virtual memory component and a physical memory component.
FIG. 2B is a representative figure one aspect of the instantly disclosed subject matter comprising two physical computing devices showing constituent elements thereof and the relationship therebetween.

FIG. 2A illustrates a virtual memory storage appliance implemented in accordance with one exemplary aspect of the present invention. Specifically, there is shown an instantiation of a user virtual computing device 200, an associated virtual memory storage appliance 202, and a physical memory component 204. Memory resources 206 represents virtual memory resources that are made available by the virtual memory storage appliance 202 and a representation of specific data types 208 that are made available to the associated virtual computing device 200. Also shown are the global namespace functional layer 210, the replication/distribution functional layer 212, and the local storage functional layer 214. The physical memory component 204 also shows a representation of available physical memory resources 216 within physical memory component 204, said resources 216 being, in this aspect, configured to have data recorded thereon according to a log-based methodology for which can be implemented directly by the local storage functional layer 214, irrespective of the physical location or other characteristics of the physical memory component 204.

FIG. 2B illustrates selected interaction between two physical computing devices in accordance with one exemplary aspect of the present invention. Specifically, first physical computing device 250 and second physical computing device 270, which may represent only two of many other devices on the network of physical computing devices, which are not shown. On first physical computing device 250, there is instantiated a virtual computing device 252. Memory instructions from virtual computing device 252 are passed to the virtual machine monitor 254. The virtual machine monitor 252 does not pass these instructions to the operating system of the host first physical computing device 250 but rather such instructions are passed to the virtual memory storage appliance 256. Virtual memory storage appliance 256 can then cause the virtual machine monitor 254 to instantiate and manage an instance of a virtual memory component 258 on the host first physical computing device 250, or it may pass some or all such instructions, via the storage appliance network 257 (which in this aspect is a private network dedicated for communicatively coupling all virtual memory storage components of the system) coupling the virtual memory storage appliances 256 and 276 to the virtual memory storage appliance 276 on the second physical computing device 270 whereby physical memory resources may be provided by the physical computing device 270. The virtual machine monitor 274 will receive instructions from virtual memory storage appliance 276 in similar way as virtual memory storage appliance 256 would provide instructions to the virtual machine monitor 254 on the first physical computing device 250. Virtual memory component 258 on the physical computing device 250 can then be associated with any physical computing resource located on any physical computing device across the network of physical computing devices, including resources on any of physical memory components 260A, 260B, 260C, 260D, 280A or 280B on either physical computing device 250 or 270 shown in FIG. 2B (or any other physical computing device communicatively coupled and having a networked virtual memory storage appliance installed thereon). Moreover, virtual memory storage appliance 256 can manage memory instructions so that one or more operational parameters that are associated with any available physical memory resource, data type, or user type, can be optimized or otherwise controlled in order to achieve one or more desired operational objectives.

Instructions from the virtual machine monitor 254 are directed via the virtual memory storage appliance 256 to, among other things: implement policy or operational objectives across the network on all available physical memory resources; prevent conflicting memory instructions by cooperatively managing with other networked appliances said instructions that relate to different virtual memory components across the network that may, for example, be sharing the same the physical resources or portions thereof; designate file system characteristics to any of the associated physical memory components in accordance with the file system relationship required by any of the one or more virtual memory components; and implementing local storage instructions on any of the physical memory components. In the case of the latter, FIG. 2B shows a data log and index 262 associated with physical memory component 260A, that illustrates the data allocation thereon, which is implemented and/or accessed according to instructions from the virtual memory storage appliance 256 for virtual computing device 252, or alternatively via the virtual memory storage appliance 256 from virtual memory storage appliance 276 for another virtual or physical computing device (not shown).

Figure 3:
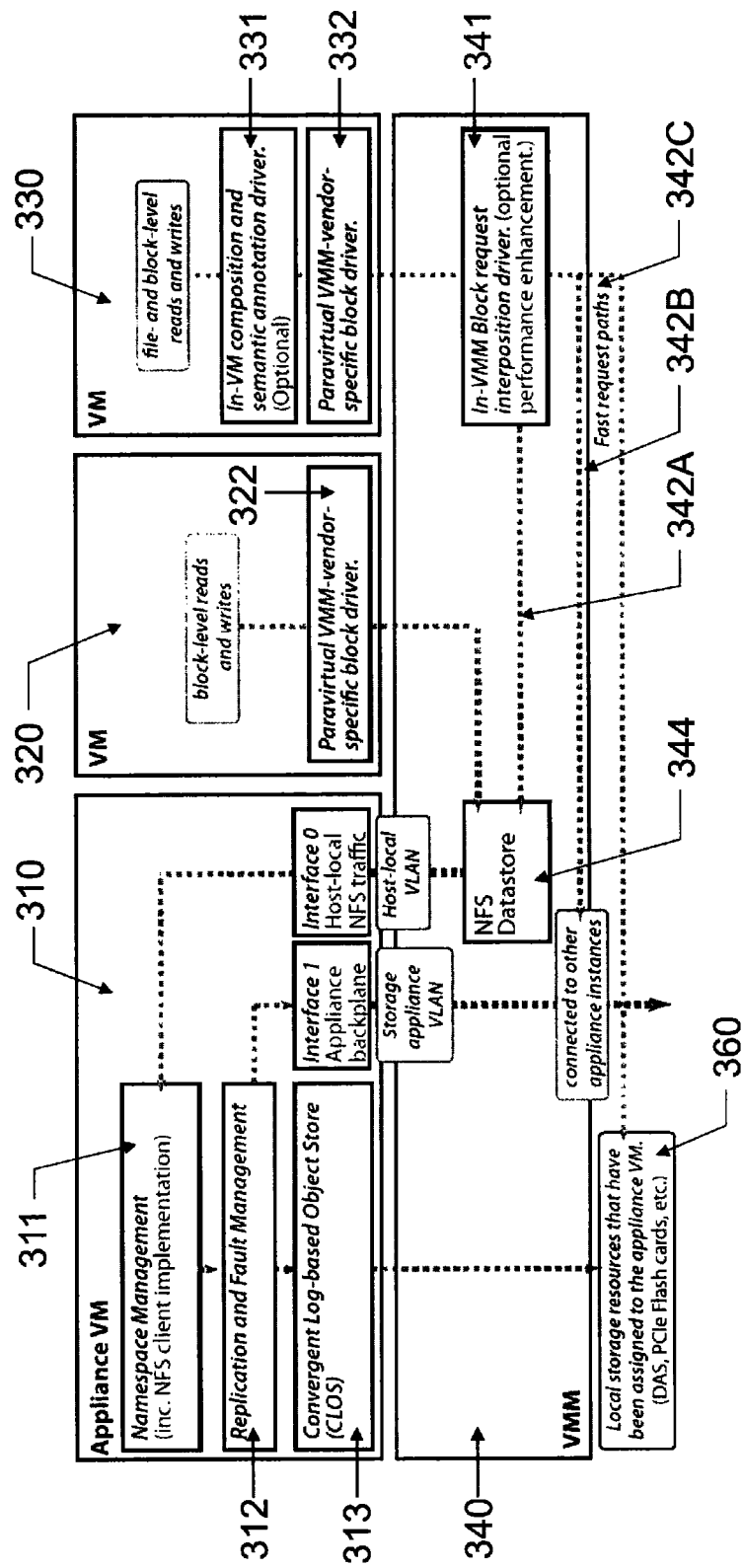
FIG. 3 is a schematic diagram characterizing aspects of the instantly disclosed subject matter.

FIG. 3 is representative of request data paths associated with various functional elements of one aspect of the instantly disclosed subject matter. The policy and configuration of the system are assumed to have been set a priori using the vCenter™ plugin in VMware™. Note that this plugin interface may later be replaced by a completely web-based interface, in support of other virtual machine monitor implementations. The preexisting configuration will determine which components are present in the system, policy for placement and replication of data across components as well as composition and decomposition of image files.

The Originating VM and in-VM Driver

Storage requests begin within the consuming virtual machines 320 and 330. These are standard virtual machine instances running any operating systems, such as Linux™ or Windows™, and hosting one or more applications. These applications issue read and write requests to files in their file system which the operating systems will translate and issue to the virtual disk (not shown). This virtual disk can be an emulated piece of hardware, but is more frequently presented to the requesting virtual machine through a "paravirtual" driver 332 or 322 (in VMware™'s case, the PV block driver is installed as part of the "VMware Tools" install in the guest VM) which provided better performance. In some aspects, an optional in-VM composition and semantic annotation driver 331 is installed by our appliance (or related software). This driver 331 may perform several functions:

First, it composes and decomposes the virtual machine 330 file system by allowing the apparently unified file system (e.g. NTFS) name space to be built from data that is stored in multiple different locations. For example, preexisting policy may indicate that all word documents on the disks of virtual machine 330 should be stored in a central location on an enterprise CIFS network attached storage device (not shown). Whenever a Word document (e.g.: *.doc *.docx) is accessed, those requests are redirected to that target instead of being stored on the local disk where the associated files appear to reside. In some aspects, this type of redirection is from directly within the In-VM driver 331 (connecting directly to a CIFS server and redirecting files to it), although other aspects may include configurations where all requests are passed through to the appliance VM 330 or 331 or associated In-VMM driver 341. These or different such aspects may be used to optimize certain types of objectives, such as to enhance security, for example.

Second, driver 331 provides additional high-level semantic information to describe block-level requests. Interposing below the block layer, as is frequently the case in a virtualized environment, throws away considerable higher-level semantic information. The driver assists with this information loss by providing additional detail regarding in-flight requests, including details regarding the file (or file-system structure) being accessed, and the accessing process or task.

Third, driver 331 may provide information about the In-VM environment. Environmental and OS-specific settings are passed down to enhance the ability to improve performance and efficiency. For example, the population and eviction events associated with the OS buffer cache are passed down in order to avoid double-caching of data in Flash-based memory, where that same data already exists in RAM.

Where the virtual machine monitor 340 provides useful inter-VM communication APIs, these may be used. In situations where such APIs are unavailable or otherwise undesirable, the In-VM driver 331 reserves a small region of disk address space and uses this as a communication range to send messages to the lower layers.

Note that this In-VM driver 331 is an optional component and is not strictly necessary for the system to function. Driver 331 enhances the ability to enforce file-level policy and facilitate image composition/decomposition.

In-VMM Block Request Interposition Driver

In-virtual machine monitor driver 341 receives block requests from the associated guest VM 330 as they arrive. The driver 341 is responsible for expediting request service time in any situations in which requests can be served without needing to be forwarded through the appliance VM instance 310. This 341 driver may have direct access to local PCIe flash devices (not shown), for instance, and so may read or write to those devices directly. This approach is particularly important in the case of high-speed memories, as the context switching and IPC overheads are relatively high as compared to memory access rates. The request "Fast Path" may redirect (or mirror) requests to both specific local storage, or to remote appliance instances on other hosts.

In-VMM driver 341 component is also optional and may serve as a performance improvement. Other aspects may use this driver 341 to interpret file-system semantics from block requests, in order to provide the same benefit as the In-VM driver 331, without requiring that such driver 331 be installed. These and other aspects may also, where the in-VMM development environment is appropriately configured, incorporate much of the functionality of the appliance 310 itself directly into the VMM 340.

Requests 342A, 342B and 342C that leave this driver without being redirected appear as normal storage requests from the guest virtual machine 330. They are passed, in VMware™'s case, to the configured data store implementation, which in our configuration is NFS. The requests are translated into interactions with the virtual machine's on-disk image file (and/or accompanying files such as a storage checkpoint, replay log, config files etc.), and sent over NFS to the configured NFS server (not shown).

The NFS server in our environment is set to provide the illusion of a single local NFS target, but may in reality be a host-local VLAN 350 with a non-forwarded IP address that is configured for every VMware™ host in the cluster: VMware™ is provided the illusion of talking to a single, central NFS server, but is in fact sending requests to a local NFS appliance 344 on each physical server.

Namespace Management

The namespace management layer 311 is responsible for mapping NFS requests to the appropriate objects and storage resources. Requests to the NFS datastore specify an operation to a specific file, for instance a read of a range of bytes at some offset within an open file (e.g. "read 4K at offset 100K in myvm.vmdk"). The namespace management layer 311 implements the NFS server protocol in order to handle this request, and then maintains an internal mapping of where the associated data is stored and how it is to be placed across available storage resources.

In situations where the In-VM composition and semantic annotation driver is used, additional (side-band) requests are processed by the namespace layer 311 to describe accesses to files that are being composed from alternate sources (and so not specifically stored as part of the virtual machine's file system on the virtual block device). These side-band requests may also provide additional information regarding block requests (for instance hinting that some requests should not be cached) and about the environment within the virtual machine 320 or 330 (for instance describing population and eviction of the operating system buffer cache. These requests are also routed and used to update mapping metadata maintained by the Namespace Management layer 311.

In the exemplary implementation of FIG. 3, this metadata may be maintained in one of two ways: First, a concurrency-safe, distributed namespace is built over the open-source Zookeeper project, and run within the appliance virtual machine. Alternatively, a specific NFS mount point may be used to store namespace mappings. The first option is more general, where the second may be preferred in situations where the appliance is configured as an in-line cache above existing enterprise NAS hardware.

The mappings made by the namespace management layer 311 interpret requests that are sourced in a guest virtual machine. Requests are mapped to a group of physical devices with an associated replication policy. Each of these physical storage instances is managed using the Convergent Log-based Object Store (CLOS—described below) and stored in a specific object within CLOS. Replication policy indicates whether an object is replicated through mirroring or erasure coding, and the set of appliance instances that are involved in this replication.

As an example, access to "myvm.vmdk" might translate to indicate that that file is stored in object id 1023, which is asynchronously mirrored between appliance instances A and B, with instance A acting as the primary. This information is passed as a translated request to the replication layer 312, which handles the request's dispatch and tracks it to completion.

Updates to the organization and available resources under management by the collection of appliances are also stored within the namespace layer 311.

Replication and Fault Management

The replication and fault management layer 312 is responsible for dispatching requests to the appropriate appliance instances, according to the object id and replication policy specified by the namespace layer 311. The current default mode of replication is 2-way "differential synchrony". In this mode, there are two appliances involved in storing identical versions of an individual object (e.g. a virtual machine image file, or component thereof). The primary appliance 310 is responsible for persisting an authoritative and durable version of all writes to disk before acknowledging them as written. This is a common mode of implementing block-based storage: the semantics of the underlying physical block device are preserved. The secondary appliance instance (not shown) also receives all write requests and acknowledges them as soon as they are buffered in memory, after which point they are flushed to disk in a timely manner. This approach provides lower durability than a synchronous write to both replicas, but preserves the performance of the disk on the primary appliance 310 rather than reverting to the slowest of the two appliance responses for all requests. In the event of failover from primary to secondary, the secondary completes all outstanding (acknowledged) writes before allowing the disk to handle new requests. This approach handles any single-host failure, and maintains crash consistency in the case of both hosts failing.

Additional replicas may be added to the configuration where higher degrees of failure tolerance and durability are required. In these cases, write requests are acknowledged as soon as the write on the primary is acknowledged by the physical storage device and at least one of the replicas has acknowledged that write and all writes that preceded it. Reads may be serviced by any of the replicas and are redirected appropriately to balance load and improve performance.

The system may also be configured to provide either fully synchronous replication or to use erasure coding of data. In synchronous replication mode, writes must be acknowledged by all replicas as being written to disk before the virtual machine-level request is acknowledged as complete. In erasure coding, a configurable k/n coding scheme is used and requests are acknowledged to the VM as soon as sufficiently many coded chunks have been written to disk as to provide recoverability.

Host failure is monitored through a combination of VMware™'s VM liveness monitoring and other liveness tracking. In the event of a failure, the system waits a configurable amount of time to avoid needlessly responding to transient loss of connectivity. After this point, new replication groups are selected for all objects that are stored on the failing appliance, and a background task populates the new appliance instances in those replication groups with the necessary per-object data.

Convergent Log-Based Object Store (CLOS)

The Convergent Log-based Object Store (CLOS) 313 provides the on-device data placement and maintenance, and the performance tiering of data across multiple classes of physical media. CLOS 313 is a log-structured layout, meaning that all writes are applied to the end of a log that grows infinitely. A background media resource review task is responsible for reclaiming unused or lightly-used log segments and returning them to a list of free segments that may be used to extend the head of the log. In a steady state, writes are applied to the log head, and the media resource reviewer chases the log tail, reaping free space and moving lightly-used segments to the head, by repacking them more densely onto new free segments. The media resource reviewer is not strictly limited to the tail of the log, as it may opt to reap lightly-used pages in the middle of the log, however it must be careful to preserve a consistent and valid view of all object data at all times.

CLOS 313 uses lookup trees to map volume checkpoints, object IDs, and offsets within objects to the appropriate locations in the log. These lookup structures are maintained in a separate log-structured layout on the physical storage device 360 and are written out lazily. In the event of a failure, the mappings and related metadata of CLOS 313 may be reconstructed by examining the outstanding region of log.

The log approach is chosen to match virtualized workloads to both mechanical and flash-based storage devices: as virtual machine storage must merge requests from many different operating systems and application instances, access patterns are highly random for both reads and writes. This results in high degrees of seeks (a problem for mechanical disks) and a great deal of fragmentation due to rewriting (a problem for flash memories).

The log structure of this CLOS 313 consolidates and serializes writes, achieving denser utilization of storage and reducing seeks. The media resource reviewer reclaims large linear regions of physical memory at once, making it easier for flash devices to reclaim clean pages of memory.

The log-based structure of this particular CLOS 313 also lends itself naturally to tiering requests across multiple types of physical storage, allowing better performance and/or offloading requests from an enterprise target. Tiering is implemented differently for reads and writes: In the write case, CLOS 313 tiering may be used to provide write-back caching by insisting that the media resource reviewer always reap from the tail of the log and that all data at the tail be written down to the next tier of storage. This implementation may also be used to achieve write-through, by forcing the write out path to be called by the writer at the head, rather than by the media resource reviewer task. Reads of written data are serviced from this write log, before being passed to lower tiers in the case of a cache miss. Read caching is implemented in a similar manner, but the log order is logically reordered to represent access frequencies, so that the media resource reviewer is able to reap the least useful data, or least likely useful data. Read cache priority can be informed by information passed from the namespace layer 311 that receives environmental information about what data is actively cached in the operating system's buffer cache; the tiered cache implementation thus attempts to avoid unnecessarily double-caching data that is already present in the higher layers.

Caching is configurable as read-only, write-through, or write-back at parameterized intervals. Tiering can be configured to arbitrary depths, and replication may be specified differently for different tiers.

Figure 4:
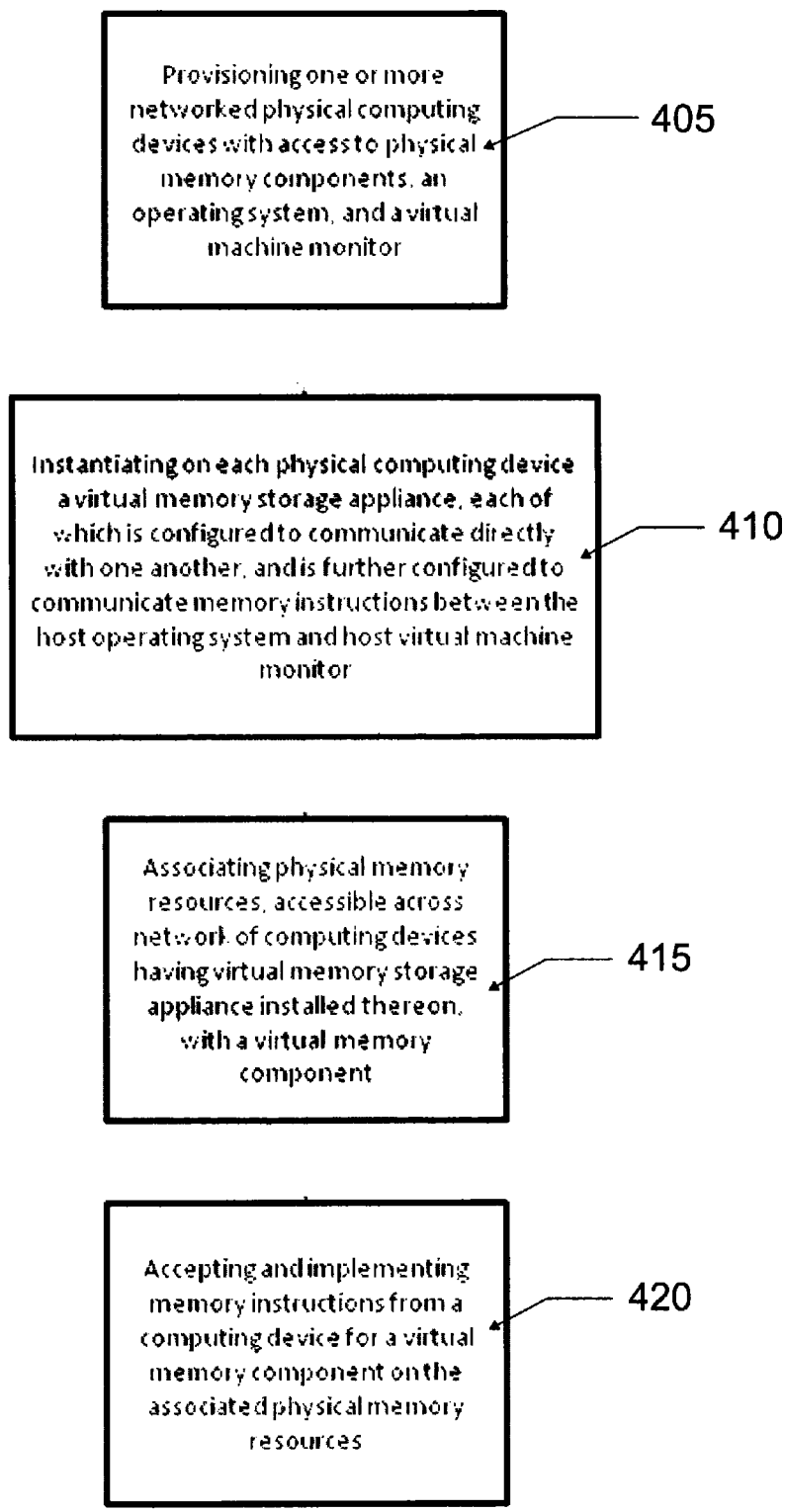
FIG. 4 is a flowchart of one aspect of the methods disclosed herein of the present invention.

By combining the functionality of these layers the federation of virtual appliances is capable of (1) decomposing the components of a virtual machine's stored data into different classes based on policy specified centrally, (2) present this data over VMware™'s supported NFS data store, (3) specify and translate per-request and per-object placement and replication requirements, and (4) dispatch requests to the relevant physical storage as required. Moreover, storage may be transparently tiered in a manner that improves performance (for example, by taking advantage of local PCIe flash devices), and/or offloads shared storage (for example, by absorbing and coalescing write requests and responding to reads from higher level caches. FIG. 4 represents an aspect of one method in accordance with the instantly disclosed subject matter. Said method comprises the following steps. In the first step 405 there is provided the provisioning of one or more networked computing devices across a communication network, wherein each such computing device comprises an operating system and a virtual machine monitor. The following step 410 relates to instantiating, on one or more of such networked computing devices, a virtual memory storage appliance, wherein said virtual memory storage appliance is configured to receive, forward, process and amend memory instructions between a host operating system, a host virtual machine monitor, and other virtual memory storage appliances on other computing devices. In a following step 415, physical memory resources from the one or more communicatively coupled physical computing devices are associated with a virtual computing component; optionally, this step may also comprise a management, mapping or indexing of the associations of the virtual memory resources to the physical memory resources. In a following step 420, memory instructions, which are operative between a computing device, a virtual memory component used in association with said computing device, and the physical memory resources associated with the virtual memory component, are accepted and implemented.

In general, file systems generally organize data in an efficient manner that is typically associated to the specific characteristics of the memory device, and such efficiency is generally achieved by a strong association between the operating system and the file system. In many distributed virtual memory systems, the operating system of a first computing device, on which the virtual memory component is instantiated, may not be capable of being closely associated to the file system, or alternatively, the file system may not be capable of being associated with the memory device. This is because in some aspects there is no single memory device, but rather a virtual memory component that uses possibly many different physical memory components, of differing memory types, and which could exist on different computing devices. In contrast, some aspects of the instant subject matter, the virtual memory storage appliance, because it is interposed on (or is otherwise configured to provide communication within) the physical computing devices between the virtual machine monitor and the operating system, can cause memory instructions for related data to be implemented in accordance with the file system that is most closely associated with any given operating system on the networked physical computing device. Accordingly, the strong association between different file systems and operating systems can be maintained, even for data objects or sub-objects that virtually reside on the same virtual memory component, but are associated with any of a number of different networked physical computing devices, each of which possibly having different operating systems and file systems. Maintaining the strong association will therefore optimize the efficiency of memory storage, or indeed any other pre-determined policy or operational objective, across the network.

In some aspects, the virtual memory components are instantiated and running on a first computing device. In other aspects, the first computing device accesses the virtual memory components via a network connection over a private or public network. The first computing device in either of these alternatives may be one of the physical computing devices that make up the systems, methods and devices disclosed herein. Alternatively, the first computing device may not have either a physical memory component used by the system or a virtual memory storage appliance. In some aspects, the first computing device is itself a virtual device.

In some aspects, the replication and distribution of data across the distributed physical memory resources by the one or more virtual memory storage appliances may use memory resource allocation methodologies, including, but not limited to, erasure coding, RAID, mirroring, or any combination thereof. Other memory resource allocation methodologies known in the art, or even methodologies that may not yet be developed, may be employed by the one or more virtual memory storage appliances without departing from the scope of the instantly disclosed subject matter, insofar as they are capable of distributing common data objects across a network of physical memory resources (e.g. disks). In addition, allocation of memory resources can be dynamic (meaning that an allocated memory resource for given data object or sub-object may be dynamically moved from resource to resource), the memory resource may be fixed for given data, or the allocation may be indexed according to a further abstraction. The memory allocation may also be configured to optimize any one or more operational objective, including, but not limited to the optimal use of available resources; optimization of safe usage and/or redundancy; optimization of speed of data read/write; optimization of speed of data locating; optimization of security; optimization of energy efficiency. The virtual memory storage appliance may, in some aspects, allocate memory resources across any of the physical memory component in a way that ensures the physical memory components best meet one or more operational objectives, remain available for use for a virtual memory component, and/or are prioritized for a virtual memory component. In this way, the allocation of memory resources by the virtual memory storage appliances can optimize any desired operational objective, and can do so much more efficiently than systems that limit virtual memory components to a narrow type or group of memory resources, or alternatively use memory resources in a manner that does not reflect the operational characteristics of those memory resources or associated computing device or physical computing component.

In addition, some aspects provide for the setting of a pre-determined storage policy across various physical memory components that achieve policy goals. For example, a given set of virtual memory storage appliances may implement a policy that ensures redundant memory storage by placing a copy of a data set from a particular virtual memory component on at least two physical memory components so that if one physical memory component fails, the data set is preserved. In other cases, a given set of virtual memory storage appliances may implement a policy that ensures that at least one physical memory component used by a virtual memory component is located on the same physical computing device on which the virtual memory component is instantiated, or alternatively, on a physical computing device that closely related to the physical computing device on which the virtual memory component is instantiated; criteria for "relatedness" in such an aspect may be determined or set by the virtual memory storage appliance, the system administrator, the end-user, or any other entity. In other examples, data files of a particular type or class, perform a related purpose, or are used by similar or associated users (or otherwise belong to a defined class of users), are associated with a particular type of physical memory component, and/or may be stored in accordance with a particular storage mode and provisioned in accordance with a particular use mode. Other predetermined policies intended to achieve a particular objective may also be devised.

These policies may, in some aspects, direct how and where information is stored with varying levels of granularity to achieve and/or maximize any operational requirement of the enterprise, system, user, data and/or physical memory component. For example, policies may be established that guide virtual memory storage appliances in how and where information is stored across the elements of the virtual memory systems described herein according to any one or more pre-determined characteristics of said elements. These pre-determined characteristics may include, but are not limited to, characteristics relating to data or file types, data usage requirements, users and user type, access rules and requirements, integrity and/or security requirements, or any other characteristic of the available physical memory components, network resources, computing resources, system(s) or enterprise type, or any combination thereof. For example, a bank may require additional security and redundancy, but reduced requirements for fast and efficient storage than, for example, an online auction facility. Accordingly, the usage of all available physical memory resources may be implemented differently in order to achieve such policy goals or operational objectives. Another example, may include a policy that results in all documents of a particular type, for example, office documents, being stored on reliable, high-performance, physical storage devices irrespective of what computer they are accessed from.

In some aspects, the methodologies of reading, writing or using information, as well as the specific physical memory components that may be used in respect of a virtual memory component may be managed by the associated virtual memory storage appliance with an extremely high level of granularity. For example, data that is virtually stored on a virtual storage component may be distributed across a plurality of physical memory components, or hierarchical or categorical tiers thereof, wherein such plurality comprises different types of physical memory components, such as hard drives, SSD, flash memory, or other memory storage media types known in the art. As different storage media may have different characteristics that impact how associated data is written to or read from it, granularity of the management of the distribution of that data is preferable in order to facilitate the most optimal mode of writing and reading data is implemented in respect of each physical memory component and its associated characteristics. This granularity of management over data sets, possibly very large data sets, permits the virtual memory systems disclosed herein to optimize performance objectives as a whole while distributing elements of such data across a high number of differing physical memory components. Indeed, the virtual memory storage appliance can select only those physical memory component types that most facilitate the desired operational objective, implement the most optimal read/write methodologies for those components for the assigned data, and, to the extent that other memory resources types are used (as may be necessary, for example, to implement a policy or because there are insufficient resources for a single type), implement other read/write methodologies that optimize the use of the other available memory resource types. Some operational objectives that may be affected by physical memory component type may include the required level of redundancy, speed and integrity requirements, optimal read/write methodologies, volatility, mutability, latency, throughput, or any other characteristic of storage media. The one or more virtual memory storage appliances may be configured at any time to implement any such policy as may be required or desired by the virtual memory storage appliance, the system administrator, the end-user, or any other entity.

Exemplary policy rules may include, but are not limited to the following:

The location, read and/or write methodologies, and storage and usage modes of data is described by a set of rules or policy that applies to all devices within an organization, or to a class of users within that organization;

The location, read and/or write methodologies, and storage and usage modes of data is described by a set of rules or policy that applies to all data types that share certain characteristics;

All office documents and email should be stored as encrypted files, and should be synchronized to a central backup on a particular file server;

Whenever a Microsoft™ exchange server is installed, it's databases should be placed on high-performance storage;

All accesses to documents relating to a particular project X should be audited into an access log;

A web service that provides search and virus scanning services should have a composed file system presented to it that contains all documents created between specified dates;

Any other rule that facilitates meeting one or more pre-determined operational objectives; and A combination of pre-determined policies, wherein the degree of achievement of one or more of such policies may be prioritized over other one or more policies.

In some aspects, one or more policies can be applied across organizations or enterprises (i.e. cross-application, cross-host, cross-user, etc.). In other aspects, policy can be applied across "semantic" layers, allowing fine grained treatment of stored memory. For instance, in a storage system that traditionally manages entire virtual memory components, policy would allow for the treatment of specific files, file types, or records within files in a different manner than other data types on the rest of the virtual memory component. In some cases, these specific files may have certain pre-determined characteristics that require, or would benefit from achieving, certain operational objectives and should therefore be stored on a particular type of physical memory resource that may be one of many types of such physical memory resources associated to a virtual memory component by way of a virtual memory storage appliance. In some aspects, this may be referred to as decomposition of data within a virtual memory component.

In some aspects, the virtual memory storage appliances are configured to implement memory instructions (i.e. instructions for reading, writing or updating data or otherwise using or accessing data, or otherwise adapting data layout to take advantage of hardware characteristics on associated physical computing devices, including but not limited to memory, processing and networking characteristics) according to log-based methods; other methods that would be known to a person skilled in the art may be implemented without departing from the scope and spirit of the instantly disclosed subject matter. The use of a log-based method allows for the composition of new file systems as collections of objects stored throughout the storage stack. Further, log-based storage can provide a reduced risk of data loss. However, alternative memory instruction implementations can also be used, such as conventional block-based non-journaling data storage schemes. In the case of log-based methods, such methods may be associated with optimizing certain operational characteristics on SSDs, as opposed to disk drives. In any case, any different memory instruction implementations as would be known to a person skilled in the art without departing from the scope and spirit of the subject matter disclosed herein, insofar as different memory instruction implementations can be used to maximize or minimize operational characteristics of the associated physical computing devices and/or their related operating systems and memory resources.

In some aspects, there is disclosed the use of hardware interfaces for IO virtualization (e.g. Intel™'s VT-D, and the PCI SIG™'s SR-IOV) to improve performance by directly exposing access to a subset of physical memory components to the virtual computing device, thereby allowing low-overhead access to that memory, while still using the virtual memory storage appliance and traditional interfaces to arbitrate access to specific physical memory components and reconfigure access and storage as necessary. I/O virtualization can generally be understood as a methodology for abstracting upper layer protocols from physical connections or physical transport protocols, by, for example, instantiating virtual interfaces from any of a variety of physical I/O devices, such as NICs or buses. In some aspects of the instantly disclosed subject matter, virtual computing devices can be provided with direct access to physical memory resources, wherein such access is arbitrated by at least the virtual memory storage appliance so as to ensure safe and non-conflicting communication of memory instructions to such physical memory devices; in such a way, virtual memory components may in some cases be managed according this disclosure and be provided a means for having access to physical memory resources that has reduced operational requirements (i.e. low overhead in terms of processing resource requirements to communicate and implement memory instructions).

In some aspects of the instantly disclosed subject matter there are provided systems, methods, and devices configured to allocate one or more priority memory resources from any of the one or more physical memory components for respective priority data types, the priority memory resources sharing one or more pre-determined memory characteristics and the data priority types sharing one or more pre-determined data type characteristics. This may include, in some aspects, prioritizing specific priority memory resources across all physical memory components, or alternatively classes of physical memory components, that share one or more pre-determined memory characteristics. Dedication of memory resources, or alternatively prioritization according to a relationship between memory characteristics and data type characteristics, can also be implemented by implementing a policy in which such relationship is stored in and applied by one or more of the virtual memory storage appliances.

The one or more memory characteristics may include, without limitation, one or more of the following: storage performance, storage durability, encryption and/or security requirements, replication requirements, synchronization requirements, audit requirements, ease of deletion, multi-client access or use requirements, rapid access/read/write, failure recovery considerations, data clustering requirements, or any combination thereof. The one or more data type characteristics include: frequency of access, sensitivity of data, security requirements, concurrent use or access requirements, data backup requirements, data auditing requirements, data search requirements, use as configuration type files, or any combination thereof. Of course, other memory and data characteristics can be considered that would be understood by a person skilled in the art without departing from the scope and spirit of the instant disclosure.

Some aspects of the instant subject matter, relate to systems, methods and devices for storing and accessing information in a virtual storage component, wherein one or more virtual memory storage appliances are configured to transform the composition of data between a first mode and a second mode, otherwise referred to as first and second usage modes, wherein the first mode is any composition of data that facilitate storage on the particular one or more physical memory components on which the data is stored, and the second mode is any composition of data that facilitates use of the data by one or more computing devices that may be accessing or using the data. The usage mode can be related to file or data format (such as would be required to open a data file in a particular application, protocol or language, including these non-limiting examples: .html, .pdf, .xml, .doc), a data collection based on a shared pre-determined characteristic, user-type access point, or any combination thereof. As an example, some aspects may utilize a common data object in a first format and, depending on desired settings, policy or operational objectives, or characteristics of a consuming first computing device, the data object may be transformed by one of the associated virtual memory storage appliances into a different format for use by such consuming first computing device.

Aspects of the instantly disclosed subject matter, the systems, methods and devices are not tied to a specific type of storage. The virtual memory storage appliance is capable of consolidating and managing numerous and heterogeneous storage targets, across different platforms. Where the system is provided with local physical memory components (such as, for example, both mechanical disk drives and SSDs) on one or more physical computing devices, there is provided in some aspects a software-based storage stack that consolidates the local physical memory components and allows data to be stored across them by, inter alia:

Implementing a log-based object store to manage the physical memory components on a single computer, including the memory instructions provided therefor;

Implementing a replication layer that forwards requests between virtual memory storage appliances running on different physical computing devices, allowing redundant versions of data to be stored for both better durability and performance; and Implementing a clustered, object interface, provided by all virtual appliance instances that make the federation of appliances appear as a single storage server; in some exemplary aspects, this interface is NFS, but any arbitrary storage interface (iSCSI™, WebDAV™, etc.) could just as readily be used.

In aspects that include existing enterprise storage (e.g., NAS or SAN), the instantly disclosed systems and devices provide for the treatment of such physical memory resources to be treated as local disks, and unified within the enterprise storage pool, or such physical memory resources can be treated as an additional tier of storage for backup and replication. In this manner, the instantly disclosed subject matter can be implemented to offload performance requirements from central enterprise storage and write data to it at a lower rate, effectively acting as a front-end caching layer.

In aspects that include very high speed local storage, such as PCI-E attached, Flash-based devices (as sold by e.g. Fusion.io™), the instantly disclosed systems and devices provide for treatment of such memory resources as a persistent front-end caching tier that can provide significantly higher performance for access to active data.

Some aspects of the instantly disclosed systems and devices may use a variety of techniques to deconstruct memory instructions to further understand the objects that requests relate to, and route/redirect requests across multiple storage targets (i.e., physical memory resources). In this manner, for example, requests can be redirected to a single database file within a virtual memory component that is itself stored as a single file. This database file may be redirected onto a different storage target, providing better performance, durability, or security. In some aspects of the instantly disclosed subject matter, redirection of files, such as the database file mentioned above in this paragraph, can be achieved by, for example, (1) installing a device driver within the operating system that is accessing the data and using the driver to interpose on and redirect storage requests; or (2) reverse engineering memory instructions made at the file system layer, and reconstructing the object-level request semantics. The latter approach additionally allows for the "composition" of new file systems as collections of objects stored throughout the storage stack. A user can create, for example, a file system that contains only log files stored from a large number of other disks. This approach is can represent a bridge from the traditional "file-oriented" business model, where users own devices and store documents on them, to a more "platform oriented" model, in which a web-based service presents all documents within a company to the users that are allowed to access them, for example, in accordance with a pre-determined policy. Aspects of the instantly disclosed subject matter therefore enable the expressiveness and management of storage to bridge this structural change in software. Aspects may provide a direct interface for users to interact with the data that they own. This can be viewed as a "side door" into the storage stack:

users can log in to a web-based interface on the storage server and perform activities such as (but not limited to):
- Searching the contents of all files that they have ownership of/access to, across all versions/backups of those files;
- Editing multiple versions of a file at once: for instance updating the configuration of one or more web servers stored in multiple virtual machines;
- Requesting that a virtual machine stored as a VMware™ (vmdk-format) image, be presented to Amazon™'s ec2™ in an appropriate image format to boot it there.

The virtual memory storage appliance may be embodied in some aspects of the instantly disclosed subject matter as a software-based router for stored data.

Whereas in traditional systems, the storage target (filer or disk) presents a container for storing data, such as a file or a block device. The thing that consumes the storage, specifically, the operating system or application, determines the format in which data should be written to within that container. The consequence of this split is that the structure and organization of data is largely determined by the application and operating system, and the semantics may be largely lost below that layer. If an administrator wants to store a database file on a separate, faster disk, she must arrange to have that disk attached to their computer, format it appropriately, and configure their database server to use it. The storage administrator is similarly limited: they manage data as it is presented by the applications and operating systems that access it. As they have limited visibility within the consuming software, they are limited in how to effectively make decisions regarding the treatment of data.

In contrast, some aspects of the instantly disclosed subject matter provides for an integrated, top-to-bottom storage stack: the virtual memory storage appliance interposes at the operating system and application layer, to determine what files or other data is being accessed, read, written, updated, etc. The virtual memory storage appliance is then able to set policy regarding how memory instructions associated with those files or data should be treated: deciding what storage devices it should be placed on, whether it should be encrypted, how it should be presented to the user (irrespective of how it may be stored) and whether audit logs should be generated. At the bottom of the storage stack, any available physical memory devices can be used by the virtual memory storage appliance, and used as targets for placing data, as determined by the routing rules.

In some aspects of the instantly disclosed subject matter, underlying storage is aggregated to be cost effective and practical to deploy, but in some cases the operating system and application interfaces must be modified or extended to allow applications to manage memory instructions and optimize operational objectives by employing the available physical memory resources in the most efficient manner as may be determined by the physical memory resource type, the data types, or the user requirements.

In some aspects, there are provided virtual memory components in which individual virtual computing devices are granted direct access to a portion of aggregated physical memory devices, where the safety of this access is mediated by the virtual memory storage appliance, and where that aggregate memory is structured as a shared data repository or file system. In such a design, the performance-sensitive data path goes directly from the virtual computing device to disk, where, for example, metadata updates and request for allocations of additional storage on the datapath or reconfigurations regarding what data can be read go through a trusted control interface to the virtual memory storage appliance. In this way, the virtual memory storage appliance may be configured to arbitrate access to specific physical memory components and reconfigure access as necessary. Since associations of multiple instances of virtual memory components with shared physical resources can in some cases cause conflict or a loss of integrity when such shared physical resources receive coincident or otherwise conflicting memory instructions relating to different associated virtual memory components, a virtual memory storage appliance that is configured to arbitrate such access or association, can thereby facilitate the prevention of conflict or loss of integrity.

In other aspects, there is provided a storage system that allows organization-wide (i.e. cross-application, cross-host, cross-user) policy to be expressed and applied to how and where data is stored. This policy dictates properties such as the placement of data on higher-performance, or more durable storage devices, the encryption of data, policy regarding replication, synchronization, audit, and forced deletion of data. The composition of data, as file or even sub-file-granularity objects, and the presentation of that data into a dynamically generated format involving either different collections of data (e.g. "All word documents from all computers in my company edited on this day") or different presentation formats (e.g. "I would like to open this VMDK-based image file as if it were stored in the VHD format).

In some aspects of the instantly disclosed subject matter, a virtual machine image, or "virtual appliance", will be configured to be installed one or more physical computing devices in order to implement a virtual memory storage appliance. In other aspects, end users may have access to a web-facing interface that provides for things like searching for files across all associated virtual machines and all of the associated backups. In the latter case, no virtual machine image may be necessary since access is provided by way of a web-facing and/or hosted application that provides for the necessary interface.

In some aspects of the instantly disclosed subject matter, there are provided methods for managing virtual memory components on one or more physical computing devices communicatively coupled across a network using virtual memory storage appliances running on each of the physical computing devices, the virtual memory storage appliances being interposed on each physical computing device between a virtual machine monitor and an operating system, and the said method comprising the steps of accepting, by the appliance, memory instructions from one or more instructing computing devices; optionally, if an instantiation of a virtual memory component is required, a first virtual memory storage appliance instantiating said virtual memory component instances; said first virtual memory storage appliance allocating memory resources from any of the one or more physical computing devices for use by the virtual memory component instances; and implementing the memory instructions on the one or more physical memory components.

In some aspects, methods disclosed herein include a memory resource allocation, or other implementation of memory instructions, that may be performed according to one or more pre-defined policies.

In some aspects, methods disclosed herein include virtual memory storage appliances that are communicatively coupled to one another over the same network as the physical computing devices upon which they are installed. In some aspects, the virtual memory storage appliances are communicatively coupled by a private network, which may be separate or different from the network of the physical computing devices. In some aspects, the virtual memory storage appliances are communicatively coupled by a virtualized private network instantiated on the physical computing device network or other such network.

In some aspects, there are disclosed methods of aggregating and managing data objects across a plurality of networked, heterogeneous storage devices using a virtual memory storage appliance, said method comprising providing a device driver which redirects storage requests from an operating system to the virtual memory storage appliance; and providing a software module which analyzes one or more object request semantics of a file system transaction, such that the transaction can be propagated by the virtual memory storage appliance to physical memory resources on other networked physical computing devices via virtual memory storage appliances stored thereon.

In some aspects of the instantly disclosed subject matter, there are disclosed devices for managing one or more virtual memory component instances (which may be instantiated on the device, or on other devices communicatively coupled to the device) using a virtual memory storage appliance, said device comprising a virtual machine monitor for managing said virtual computing devices, a virtual memory storage appliance instance for associating and managing one or more storage resources on the device or one or more networked computing devices (physical or virtual) to the one or more virtual memory component, wherein said virtual memory storage appliance instance is interposed between, or is otherwise disposed to communicate with, the virtual machine monitor and an operating system running on the device. The virtual memory storage appliance may be configured to be communicatively coupled with virtual memory storage appliances running on other devices having access to storage resources, including when associated storage resources are located on other networked devices, when such association and/or management may occur via virtual memory storage appliances installed on such other networked devices in a manner analogous to the virtual memory storage appliance installed on the device, including, in some aspects, by being interposed between the virtual machine monitor and the operating system thereof.

In some aspects, devices are disclosed that further comprise an interface for allowing a user to set one or more policies for allocating memory resources by said virtual memory storage appliance instance. In some aspects, devices are disclosed wherein said virtual memory storage appliance instance consolidates said one or more storage resources on networked physical computing devices into a unified virtual storage resource.

In another aspect of the instantly disclosed subject matter, there is disclosed a virtual memory storage appliance for managing one or more virtual memory component instances, said appliance being, but not limited to, a computer program product, an image of a computer program product, a computer program product embodied as a set of instructions recorded on computer-readable storage media, a virtual instance of a computer program product or of a virtual computing device with a virtual memory storage appliance installed thereon. In some aspects, a virtual memory storage appliance comprises a communication component for communicating with a virtual machine monitor, an operating system, and other virtual memory storage appliances which may be installed on other communicatively coupled computing devices. In general, virtual memory storage appliances are interposed between the virtual machine monitor and an operating system running on the computing device upon which the virtual memory storage appliance is installed.

In some aspects, virtual memory storage appliances are disclosed that are further configured to accept one or more policies for allocating and managing memory resources by said virtual memory storage appliance instance.

In some aspects, virtual memory storage appliances are disclosed that consolidates said one or more storage resources on a local computing device into a unified virtual storage resource.

In some aspects of the instantly disclosed subject matter, there are provided uses of the systems, methods, and devices disclosed herein to provide virtual memory resources for providers of virtual computing systems. In some aspects, aspects of the instantly disclosed subject matter include uses of the systems, methods, and devices disclosed herein to provide and/or manage virtual memory components that are made available from the memory resources on the servers or devices that provision the virtual computing systems. In other aspects, there are provided uses of the disclosed systems, methods and devices, to provide enterprise storage that can provide and/or manage virtual memory components, optionally in accordance with one or more predetermined policies, for any network of communicatively coupled physical computing devices, wherein at least one of which comprises physical memory resources. In some aspects, the disclosed uses and methods may include incurring charges upon utilization of the disclosed systems, methods, and devices, including, for example, incurring charges upon the communication of memory instructions, upon usage of physical memory on a fee per unit of memory basis and/or unit of time basis, upon use or installation of virtual memory storage appliances on a per installed appliance basis (or alternatively as a license to a set number of appliances).

In some aspects, there are provided uses of the systems, methods and devices disclosed herein that, inter alia, provide for combining multiple, distributed disks into a single aggregate virtual memory storage facility and, optionally, optimizing efficiency and safety, or a combination thereof based on user-specified requirements and priorities (i.e. a user may choose to optimize, for example, efficiency to the detriment of safety, or vice versa, in accordance with operational objectives); the detection and diagnosis of performance problems across any of the physical machines on which the physical memory resources are located or have access to; safe distribution of data and recovery from failures of individual components on the system; caching and replicating of data; memory resource transfer to, for example, maximize benefits relating to the available storage means, methodologies or media for any and each of the physical devices that may be providing such storage for a given virtual memory component.

In other aspects, there are provided uses of the various systems, methods and devices disclosed herein for, inter alia, (a) managing storage for devices that are not directly running on top of a virtual environment, such as notebooks, tablets, and mobile phones, where storage could be backed by this system and portions of this system might be implemented on the mobile device itself; and (b) allowing users to manage and place data across multiple storage providers, for instance by providing an interface the explicitly allows users to move storage from a provider such as an enterprise network to a different enterprise or cloud provider.

In some systems, there are provided systems, methods and devices for managing, storing and accessing information stored in virtual memory components using one or more virtual memory storage appliances, each of such appliances being, or being configured to be, communicatively coupled with one another and each of such appliances being configured to interpose between a virtual machine monitor and an operating system on one of a plurality of communicatively coupled physical computing devices, wherein one or more of the virtual memory storage appliances are configured to allocate one or more first memory resources from any of the one or more physical memory components of the physical computing devices for one or more first data types, the first memory resources sharing one or more pre-determined memory characteristics and the first data types sharing one or more pre-determined data type characteristics. In some aspects, allocation can refer to giving rise to an indication that a physical memory resource is more capable of meeting a particular requirement than other physical resources, that a particular physical memory resource is to be dedicated for a particular use, that a particular physical memory resource is to be prioritized for a particular use over other physical memory resources, or that a particular physical memory resource is available for a particular use. In exemplary aspects, some types of physical memory storage may provide varying levels of different operational characteristics that would be better suited for (a) certain types of data having certain types of data type characteristics; or (b) achieving a pre-determined operational objective as requested by, for example, the user or system administrator. The first memory characteristics and operational objectives may include, but are not limited to, characteristics relating to speed, integrity, redundancy, persistence, security, methodology of implementing memory instructions (e.g. log-based methods and conventional block-based non-journaling data storage schemes or other methodologies known in the art), association with a file system (i.e. whether or not use of a particular file system will tend to increase or decrease achievement of a particular operational objective or policy on a particular type of physical memory resource). Other characteristics of memory resources known to persons skilled in the art can be considered a pre-determined memory characteristic, whether or not disclosed herein or even known at the time of filing, without departing from the spirit or scope of the disclosed subject matter. The data type characteristics may apply to data types that, for example, are likely to be read, written or updated more or less frequently, are more sensitive to corruption or threat, have a requirement to be read, written and/or updated in a high-speed manner or need only be read, written and/or updated in a low-speed and/or infrequent manner, need to be accessed by many users, need to be accessed by a narrow class of users. Other data characteristic known to persons skilled in the art can be considered to be an applicable pre-determined data type characteristic, whether or not disclosed herein or even known at the time of filing, without departing from the spirit or scope of the disclosed subject matter.

In some aspects, specific memory resources across all physical memory components, having one or more shared pre-determined memory characteristics, may be dedicated and/or prioritized by one or more of the virtual memory storage appliances for use by data types having one or more shared pre-determined data types characteristics. To the extent that physical memory resources are not available or for which another use is more highly prioritized, other physical memory resources may be used that may provide a reduced ability to achieve an operational objective or policy. The level of prioritization, or acceptable reduction in ability to meet such operational objective or policy may be pre-determined by a user or administrator. In some aspects, physical memory resources can be dedicated or prioritized according to a policy or policies that best leverage relationships between memory characteristics and data type characteristics to best achieve said policy or policies. In some aspects, policies or operational objectives can be applied across organizations (i.e. cross-application, cross-host, cross-user, etc.). In some aspects, policy can be applied across "semantic" layers, allowing finer grained treatment of stored memory than has traditionally been possible. For instance, in a storage system that traditionally manages entire virtual memory components, on exemplary policy would allow for the treatment of specific files, file types, or records within files in a different manner than the rest of the virtual memory component. Memory characteristic may include, but are not limited to: high-performance storage capability, durable storage capability, configured for encrypted data, configured for replication, configured for synchronization, configured for audit requirements, configured for ease of deletion, configured for multi-client access or use, configured for rapid access/read/write, etc., or a combination thereof. Data type characteristics may include, but are limited to: frequency of access, high or low sensitivity, security requirements, accessible by multiple users for concurrent use, configuration type files, etc., or a combination thereof.

In other aspects of the instant invention, there are provided systems, methods and devices for managing, storing and accessing information stored in virtual memory components using one or more virtual memory storage appliances, each of such appliances being, or being configured to be, communicatively coupled with one another and each of such appliances being configured to interpose between a virtual machine monitor and an operating system on one of a plurality of communicatively coupled physical computing devices, wherein one or more of the virtual memory storage appliances are configured to transform the composition of data between one or more first modes and one or more second modes, wherein a first mode is any composition that facilitates storage on the particular physical memory resources (including when such resources are unified on particular physical memory component or distributed across a plurality of physical memory components) on which data associated with a particular virtual memory component is stored, and the second mode is any mode that facilitates use of the data by, without limitation, a user, a system, an enterprise, a virtual computing devices that utilizes the data, or the physical computing device upon which a user accesses the virtual computing device. The first or second modes can be related to file or data format, a data collection based on a shared predetermined characteristic, user-type access point, other modality/format/composition, or any combination thereof.

In some aspects, the one or more virtual memory storage appliances are configured dynamically create different presentations of objects that may be stored in a virtual memory component to different users or via different virtual computing devices. This may be achieved by live or real-time translation of virtual memory device image files from one format to another (e.g. to or from virtual hard disk file format ("VHD"), virtual machine disk format ("VMDK"), raw block device, among others) as their or their related sub-objects' association with different physical memory components (which would, for example, enable more optimal achievement of a particular operational or policy objective) or virtual memory components is transferred. In some aspects, there is provided real-time management of composition of file systems with specific contents (e.g. all word documents) and presentation of those contents at both a file (NFS/CIFS) and synthesized block and file-system-level (NTFS/EXT2) as data relating to objects or sub-objects is associated with different virtual memory components and/or physical memory components.

EXAMPLES

Use Case 1—Plugin for vCenter™

In some exemplary aspects, a system of computing devices that are communicatively coupled will have thereon installed, and be configured to work against, common and commercially available virtualization platforms such as VMware™ vSphere™, VMware™ ESX, Microsoft™ Hyper-V™, and Citrix™ XenServer™. In the aspect described below, there is described a system supporting specifically for VMware™'s virtualization products.

The initial component on each physical computing device on the network that is installed is a plugin to vCenter™, the management interface for VMware™. This component will add a new tab to vCenter's user interface and provide tools to collect, analyze, and visualize the performance of virtual machines, in particular with regard to storage. This initial component takes advantage of multiple sources of performance data, including VMware™'s data on performance logging facilities, and trace instrumentation that we install. The initial component will identify for VMware administrators opportunities to improve the performance and efficiency of their system, in particular from a storage perspective.

The initial component is configured to study the dynamic workload, historical performance data, and available hardware to help provide these services. Based on its analysis of the workload, configuration, and available system resources, it will recommend actions that the administrator may take to improve the state of the system. These actions will include the following:

1—Install Additional Tools into Individual VMs to Collect Extra Performance Data In this case, Windows™ or Linux drivers will be installed into VMs, allowing the collection of finer-grained analysis. This will collect information such as the specific block addresses and files that are being accessed on available physical memory resources across the system, population and victimization of the VM's buffer cache, and the set of running processes. This data will be collected and made available to the vCenter™ plugin to add additional analysis.

2—The installation of the Convergent.IO™ Virtual Memory Storage Appliance on all Hosts in the Cluster This virtual memory storage appliance will present one or more new VMware™ datastores, over the NFS protocol. These may be new datastores, or they may replace existing NFS datastores in order to interpose on accesses to existing storage resources that have already been configured for VMware™.

The appliance installer will interact with the administrator to select a list of physical storage resources that may be placed under the collective control of the appliances (although it should be noted that in other aspects, some or all available physical storage resources can be placed such control according an automated selection process). This includes local PCIe flash cards, local disks, and available NFS mounts. In the case of local disks, the installer will "scavenge" for empty VMFS-formatted local disks that have been initialized during the VMware™ installation, but not populated with any useful data. It will recommend that these disks be used by the appliances.

Once the appliances are installed, the system will, with some interaction with the VMware™ administrator, optimize the use of available storage. Actions that are taken will include (a) caching reads and/or writes from a given VM to PCIe flash (or other local storage) before accessing enterprise storage targets, (b) using an aggregation of replicated local disks to store VM data in place of enterprise storage, (c) electing to not store, or store at a different level of durability or availability, a subset of the files within a VM.

The appliance VM contains a Linux-based operating system, an NFS server implementation to allow presentation to VMware™ as an NFS data store, a replication layer that allows stored objects to be synchronously or asynchronously mirrored across two or more appliance instances, and a log-structured object store. This log-structured store, called CLOS in this exemplary implementation, is optimized for VM workloads and for managing storage on one or both of magnetic and flash-based media. It is specifically designed to support tight integration and customization for individual enterprise flash implementations.

Appliance instances in this exemplary aspect have two virtual network interfaces. One is a host-local interface that allows it to be presented to VMware as an NFS datastore. The IP presented by each appliance instance is the same on every host, resulting in the illusion that all servers are communicating with a single, centralized NFS server. The second interface is a private backplane network that interconnects all of the appliance instances. This interface is isolated on its own VLAN and is used for appliance-to-appliance replication and management traffic.

Neither of these networks is exposed directly to the VMs that use the resulting NFS data store, all requests from these VMs are passed through the virtualized block interface, or through the private channel established by an in-VM driver.

In the current implementation, each appliance VM has 512 MB of memory and uses a single virtual CPU. These options may be tuned according to performance and workload demands.

3—the vCenter™ Plugin Also Provides Facilities to Guide Hardware Purchases and Reconfigurations to Best Improve Performance in the Virtualized Environment This will advise administrators as to whether they would benefit from, for instance, purchasing PCIe flash memory cards for some or all hosts in the cluster, purchasing additional disks, or spending to improve the performance of their enterprise storage array. In all of these cases, the virtual appliance layer incorporates this new hardware into the system.

The vCenter™ plugin and the per-server virtual appliances may install two additional components: (1) a VMware™ ESX driver that interposes on storage requests originating from individual virtual machines and redirects them appropriately without having to pass requests through the appliance instance on that host. This is a performance optimization that reduces the per-request overhead. To achieve it, the VMware™ driver incorporates additional logic from the appliance that allows request routing and forwarding decisions to be made on a faster data path. (2) one or more in-VM (Windows or Linux, for instance) drivers that allow the interposition of requests within the guest, at which point greater semantic details (such as the file being accessed, the program accessing, and information regarding the management of in-guest caching) may be accessed. These drivers allow requests to be redirected through alternate I/O paths, including using a region of the disk's address space as a channel through which storage related messages may be tunneled. The driver allows for the composition and decomposition of files and file systems within the VM, for instance by redirecting the storage of document files onto an alternate storage target, or labeling unimportant files as not requiring caching or persistent storage.

Although the invention has been described above by reference to certain aspects and examples of the invention, the invention is not limited to the aspects described above. Modifications and variations of the aspects described above will occur to those skilled in the art in light of the above teachings.

What is claimed is:

1. A digital information storage system comprising:
a plurality of physical computing devices, each physical computing device being communicatively coupled over a network and comprising a physical memory component, a virtual machine monitor, and a virtual memory storage appliance communicatively interposed between the virtual machine monitor and the physical memory component, wherein said physical memory component comprises one of at least two memory storage types, and wherein each of said types has a respective distinguishing memory request processing characteristic associated therewith relating to memory request processing latency;
wherein a given virtual memory storage appliance on a given physical computing device having a given physical memory component Is operable to communicate with respective other virtual memory storage appliances on respective other physical computing devices having respective other physical memory components, wherein each said respective other physical memory components comprises one of the at least two memory storage types, said given virtual memory storage appliance configured to selectively associate a virtual memory component with any of said given physical memory component and said respective other physical memory components, based at least In part on said respective distinguishing memory request processing characteristic associated with a given memory storage type thereof, to store digital information for use by said virtual memory component; and
wherein said given virtual memory storage appliance and said respective other virtual memory storage appliances operate cooperatively to coordinate selective associations for the virtual memory component.

2. The system of claim 1, wherein each said virtual memory storage appliance is further configured to instantiate instances of virtual memory component.

3. The system of claim 1, wherein the at least one virtual memory storage appliance is configured to prioritize at least one physical memory component for use by any virtual memory component.

4. The system of claim 1, wherein the at least one virtual memory storage appliance is configured to prioritize memory components according to at least one of the following: a pre-determined storage policy, a user characteristic, and an operational objective.

5. The system of claim 1, wherein the selective association of memory components to the virtual memory components is in accordance with a pre-defined storage policy.

6. The system of claim 1, wherein said virtual memory component is instantiated on one of the following: a first computing device, and a computing device communicatively coupled to a first computing device.

7. The system of claim 1, wherein the selective association of the memory components to the virtual memory components is further based on at least one of: dynamic data storage characteristics, fixed data storage characteristics, utilization of available component, achieving optimized security, minimizing memory failure, maximizing reliability of memory components, speed of implementation of memory instructions, and requirement of multi-user access.

8. The system of claim 1, wherein the selective association of the memory components to the virtual memory components preferentially associates physical memory components having operational characteristics that facilitate achieving at least one operational objective.

9. The system of claim 1, wherein data is distributed amongst the physical memory components in accordance with a distributed disk management methodology.

10. The system of claim 9, wherein the distributed disk management methodology comprises at least one of erasure coding, redundant array of independent disks, and mirroring.

11. The system of claim 1, wherein at least one of the physical computing devices from the plurality of physical computing devices comprise two or more physical memory components.

12. A method of managing a digital information storage system, the method comprising:
providing access to a plurality of physical computing devices, each of the physical computing devices being communicatively coupled over a network and comprising the following communicatively coupled components: a physical memory component and a virtual machine monitor, wherein said physical memory component comprises one of at least two memory storage types, and wherein each of said types has a respective distinguishing memory request processing characteristic associated therewith relating to memory request processing latency;
instantiating on each physical computing device a virtual memory storage appliance, the virtual memory storage appliance on each of said physical computing devices being communicatively interposed between the physical memory component and the virtual machine monitor, wherein a given virtual memory storage appliance on a given physical computing device with a given physical memory component is communicatively coupled with respective other virtual memory storage appliances on respective other physical computing devices with respective other physical memory components, wherein each said respective other physical memory components comprises one of said at least two memory storage types; and
communicating memory Instructions between any of said computing devices and one or more virtual memory components, wherein said given virtual memory storage appliance is operable to selectively associate the one or more virtual memory components with any of said given physical memory component and said respective other physical memory components, based at least In part on said respective distinguishing memory request processing characteristic associated with a given memory storage type thereof, to store digital information for use by said one or more virtual memory components;
wherein said given virtual memory storage appliance and said respective other virtual memory storage appliances operate cooperatively to coordinate selective associations for the virtual memory component.

13. The method of claim 12, wherein each said virtual memory storage appliance is further configured to instantiate instances of virtual memory components.

14. The method of claim 12, wherein the the one or more virtual memory storage appliances are further operable to prioritize at least one physical memory components for use by any of the one or more virtual memory components.

15. The method of claim 14, wherein the prioritization of the memory components occurs according to at least one of the following: pre-determined storage policy, a user characteristic, and an operational objective.

16. The method of claim 12, wherein the selective association of memory components to the one or more virtual memory components is in accordance with a pre-defined storage policy.

17. The method of claim 16, wherein the pre-defined policy applies across all said physical computing devices in an organization.

18. The method of claim 12, wherein the one or more virtual memory components are instantiated on at least one of: one of the plurality of physical computing devices, and any other computing device communicatively coupled to the plurality of physical computing devices.

19. The method of claim 12, wherein the selective association of the memory components to the virtual memory components is further based on at least one of: dynamic data storage characteristics, fixed data storage characteristics, utilization of available components, achieving optimized security, minimizing memory failure, maximizing reliability of memory components, speed of implementation of memory instructions, and requirement of multi-user access.

20. The method of claim 12, wherein the selective association of the memory components to the virtual memory components preferentially associates physical memory components having operational characteristics that facilitate achieving at least one operational objective.

21. The method of claim 12, wherein data is distributed amongst the physical memory components in accordance with a distributed disk management methodology.

22. The method of claim 21, wherein the distributed disk management methodology comprises at least one of: erasure coding, redundant array of independent disks, and mirroring.

23. The method of claim 12, wherein at least one of the physical computing devices from the plurality of physical computing devices comprise two or more physical memory components.

24. A device for implementing one or more virtual memory component instances in a digital information system, said device comprising:
a processor and a physical memory component;
access to at least one virtual machine;
a virtual machine monitor for managing the at least one virtual machine; and
a virtual memory storage appliance configured to be communicatively coupled with respective other virtual memory storage appliances running on respective other physical computing devices having respective other physical memory components, wherein each of said physical memory component and the respective other physical memory components comprises of one of at least two memory storage types, and wherein each of said types has a respective distinguishing memory request processing characteristic associated therewith relating to memory request processing latency;
wherein said virtual memory storage appliance is communicatively interposed between the virtual machine monitor and the physical memory component, and said virtual memory storage appliance is further configured to selectively associate, based at least in part on said respective distinguishing memory request processing characteristic associated with a given memory storage type on the physical memory component, said virtual memory component instances with any of the physical memory component and the respective other physical memory components;
wherein said given virtual memory storage appliance and said respective other virtual memory storage appliances operate cooperatively to coordinate selective associations for the virtual memory component.

25. The device as defined in claim 24, further comprising an interface for allowing a user to set at least one policy for allocating memory components by said virtual memory storage appliance.

26. The device as defined in claim 24, wherein said virtual memory storage appliance instance consolidates the physical memory components on the physical computing devices that are communicatively coupled over a network Into a unified virtual storage resource.

27. The device of claim 24, wherein at least one of the device and respective other physical computing devices comprise two or more physical memory components.

28. A system for storing and accessing information for use by at least one first computing device, the system comprising at least two physical computing devices, each of the at least two physical computing devices being communicatively coupled over a network and comprising at least one of a plurality of physical memory components, a virtual machine monitor, and a virtual memory storage appliance communicatively interposed between the virtual machine monitor and the physical memory component, wherein each of said plurality of physical memory components comprises of one of at least two memory storage types, and wherein each of said types has a respective distinguishing memory request processing characteristic associated therewith relating to memory request processing latency, wherein a given virtual memory storage appliance on a given physical computing device having a given physical memory component is operable to communicate with respective other virtual memory storage appliances on respective other physical computing devices with respective other physical memory components, and to selectively associate any of the given physical memory component and the respective other physical memory components with a virtual memory component accessible by the at least one first computing device, wherein at least one of the physical memory components that is a first memory storage type is allocated for storing a first data type, the first data type having at least one data type characteristic related to the distinguishing memory request processing characteristic associated with the first memory storage type;
wherein said given virtual memory storage appliance and said respective other virtual memory storage appliances operate cooperatively to coordinate selective associations for the virtual memory component.

29. The system of claim 28, wherein the allocation of elements of the at least one first memory resource is dynamic.

30. The system of claim 28, wherein the allocation facilitates achievement of at least one operational objective.

31. The method of claim 12, wherein the selective association of memory components is configured to allocate a first physical memory component for at least one first data type, the at least one first physical memory resource comprising one of the at least two memory storage types and the at least one first data type having at least one pre-determined data type characteristic.

32. The method of claim 31, wherein the selective association is dynamic.

33. The system of claim 28, wherein at least one of the physical computing devices comprise two or more physical memory components.

* * * * *